US010866102B2

(12) United States Patent
Holz

(10) Patent No.: US 10,866,102 B2
(45) Date of Patent: Dec. 15, 2020

(54) LOCALIZATION OF ROBOTIC VEHICLES

(71) Applicant: X Development LLC, Mountain View, CA (US)

(72) Inventor: Dirk Holz, Mountain View, CA (US)

( * ) Notice: Subject to any disclaimer, the term of this patent is extended or adjusted under 35 U.S.C. 154(b) by 657 days.

(21) Appl. No.: 15/390,460

(22) Filed: Dec. 23, 2016

(65) Prior Publication Data

US 2018/0180421 A1 Jun. 28, 2018

(51) Int. Cl.
*G01C 21/20* (2006.01)
*G05D 1/02* (2020.01)
(Continued)

(52) U.S. Cl.
CPC ......... *G01C 21/206* (2013.01); *G01C 21/005* (2013.01); *G01S 17/88* (2013.01); *G05D 1/024* (2013.01); *G05D 1/0221* (2013.01); *G05D 1/0234* (2013.01); *G05D 1/0268* (2013.01); *G05D 1/0272* (2013.01);
(Continued)

(58) Field of Classification Search
None
See application file for complete search history.

(56) References Cited

U.S. PATENT DOCUMENTS 6,965,209 B2 11/2005 Jones et al.
9,286,810 B2 3/2016 Eade et al.
(Continued)

FOREIGN PATENT DOCUMENTS

EP 1331537 7/2003
JP 2007257226 A 10/2007
(Continued)

OTHER PUBLICATIONS

Arya, S., D. M. Mount, N. S. Netanyahu, R. Silverman, and A. Y. Wu. An Optimal Algorithm for Approximate Nearest Neighbor Searching in Fixed Dimensions. Journal of the ACM, vol. 45, No. 6, pp. 891-923.
(Continued)

*Primary Examiner* — Robert T Nguyen
(74) *Attorney, Agent, or Firm* — McDonnell Boehnen Hulbert & Berghoff LLP

(57) ABSTRACT

An example method includes determining locations of a plurality of candidate landmarks in relation to a robot based on sensor data from at least one sensor on the robot. The method further includes determining a plurality of sample sets, wherein each sample set comprises a subset of the plurality of candidate landmarks and a plurality of corresponding mapped landmarks. The method also includes determining a transformation for each sample set that relates the candidate landmarks from the subset to the corresponding mapped landmarks. The method additionally includes applying the determined transformation for each sample set to the plurality of candidate landmarks to determine a number of inliers associated with each sample set based on distances between the transformed plurality of candidate landmarks and a plurality of neighbouring mapped landmarks. The method further includes selecting a sample set from the plurality based on the number of inliers associated with each sample set. The method still further includes estimating a pose of the robot based on the selected sample set.

20 Claims, 15 Drawing Sheets

(51) Int. Cl.
*G01S 17/88* (2006.01)
*G01C 21/00* (2006.01)
*B25J 5/00* (2006.01)
*B25J 9/16* (2006.01)
*G01C 1/00* (2006.01)

(52) U.S. Cl.
CPC ............... *G05D 1/0274* (2013.01); *B25J 5/00* (2013.01); *B25J 5/007* (2013.01); *B25J 9/162* (2013.01); *G05D 1/0276* (2013.01); *G05D 2201/0216* (2013.01)

(56) References Cited

U.S. PATENT DOCUMENTS

| | | | | |
|---|---|---|---|---|
| 9,679,381 | B2* | 6/2017 | Martini | G06T 7/0008 |
| 10,025,886 | B1* | 7/2018 | Rublee | G01B 11/254 |
| 2008/0027591 | A1 | 1/2008 | Lenser et al. | |
| 2011/0310087 | A1* | 12/2011 | Wright, Jr. | G06T 13/80 |
| | | | | 345/419 |
| 2012/0121161 | A1 | 5/2012 | Eade et al. | |
| 2012/0323431 | A1 | 12/2012 | Wong et al. | |
| 2013/0138246 | A1* | 5/2013 | Gutmann | G05D 1/0231 |
| | | | | 700/253 |
| 2014/0240501 | A1* | 8/2014 | Newman | G06T 7/77 |
| | | | | 348/148 |
| 2014/0241576 | A1* | 8/2014 | Yu | G06T 7/55 |
| | | | | 382/103 |
| 2018/0306589 | A1* | 10/2018 | Holz | G05D 1/0297 |
| 2018/0307241 | A1* | 10/2018 | Holz | G01C 21/165 |

FOREIGN PATENT DOCUMENTS

| | | | | |
|---|---|---|---|---|
| JP | 2012083855 | | 4/2012 | |
| KR | 10-0919944 | | 10/2009 | |
| KR | 10-2010-0073190 | | 7/2010 | |
| WO | 2012040644 | A1 | 3/2012 | |
| WO | 2014020317 | A1 | 2/2014 | |
| WO | WO-2017/020317 | * | 2/2014 | ............... G06T 7/00 |

OTHER PUBLICATIONS

Besl, Paul J.; N.D. McKay (1992). "A Method for Registration of 3-D Shapes". IEEE Trans. on Pattern Analysis and Machine Intelligence. Los Alamitos, CA, USA: IEEE Computer Society. 14 (2): 239-256.

Marius Muja and David G. Lowe, "Fast Approximate Nearest Neighbors with Automatic Algorithm Configuration", in International Conference on Computer Vision Theory and Applications (VISAPP'09), 2009.

Elseberg J, Magnenat S, Siegwart R and Nuechter A, "Comparison of nearest-neighbor-search strategies and implementations for efficient shape registration.", Journal of Software Engineering for Robotics (JOSER), 3(1), pp. 2-12. 2012.

A. V. Segal, D. Haehnel, and S. Thrun., "Generalized-ICP", In Robotics: Science and Systems, 2009.

Notice of Reasons for Rejection for Japanese Patent Application No. 2018-56104, dated Jun. 1, 2020.

* cited by examiner

FIG. 11A
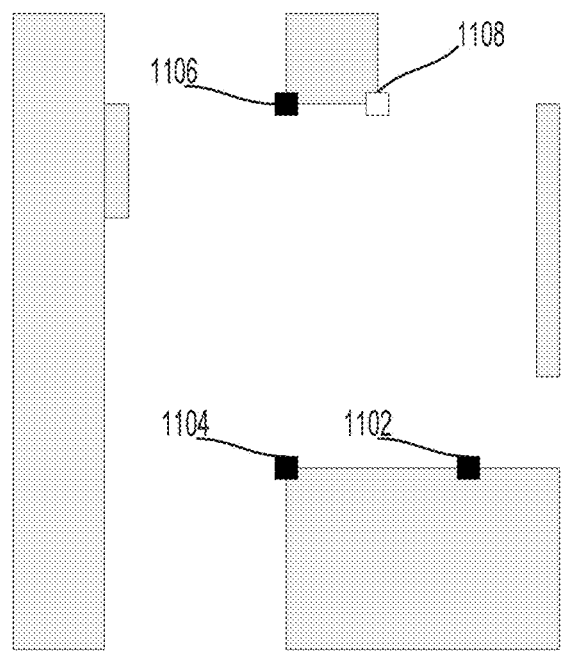
FIG. 11B
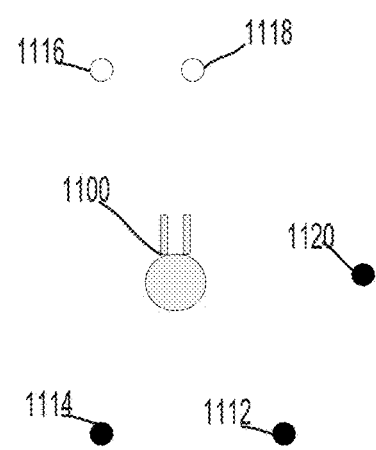
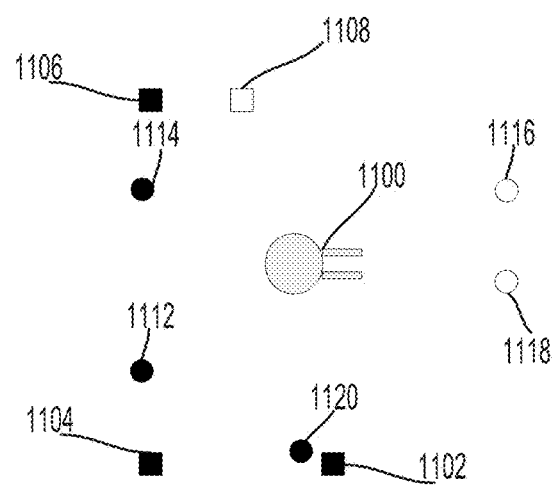
FIG. 11C
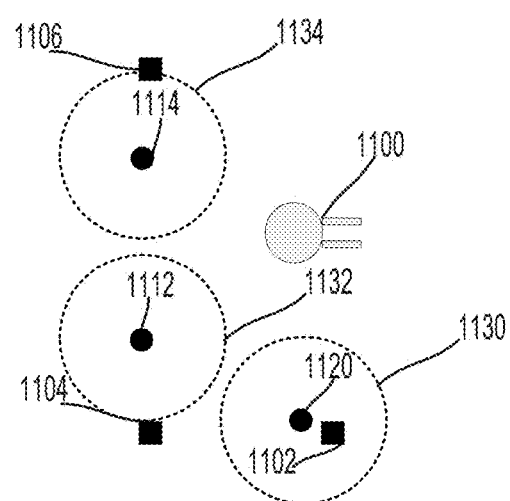
FIG. 11D

LOCALIZATION OF ROBOTIC VEHICLES

BACKGROUND

A warehouse may be used for storage of goods by a variety of different types of commercial entities, including manufacturers, wholesalers, and transport businesses. Example stored goods may include raw materials, parts or components, packing materials, and finished products. In some cases, the warehouse may be equipped with loading docks to allow goods to be loaded onto and unloaded from delivery trucks or other types of vehicles. The warehouse may also use rows of pallet racks to allow for storage of pallets, flat transport structures that contain stacks of boxes or other objects. Additionally, the warehouse may use machines or vehicles for lifting and moving goods or pallets of goods, such as cranes and forklifts. Human operators may be employed to operate machines, vehicles, and other equipment. In some cases, one or more of the machines or vehicles may be robotic devices ("robots") guided by computer control systems. The computer control systems may localize the one or more robots in relation to markers distributed throughout the warehouse. Localizing the robots may allow the computer control systems to navigate the one or more robots through the warehouse.

SUMMARY

Example systems and methods may help to estimate a pose of a robot within an environment of the robot. An environment of the robot may include landmarks. The locations of the landmarks may be mapped. Systems may allow the robot to localize itself within the environment based on its pose relative to the mapped landmarks. To localize the robot, the robot may include sensors that receive signals from the landmarks indicative of locations of the landmarks. However, not all received signals will emanate from a mapped landmark. Thus, each detection from the received signals may be treated as a candidate landmark. The systems may vet the candidate landmarks to determine which correspond to mapped landmarks, and determine the pose of the robot based on the candidate landmarks determined to be mapped landmarks. The systems may sample multiple subsets of the candidate landmarks and corresponding mapped landmarks. The systems may determine a transformation of each sampled subset that aligns the subset of candidate landmarks to the corresponding mapped landmarks. The transformation may be applied to all of the candidate landmarks. Distances between the transformed candidate landmarks and neighboring mapped landmarks that are within an inlier distance threshold may be considered "inliers." Inliers may be indicative of whether the applied transformation accurately represents the pose of the robot. A sample set that produces a higher number of inliers is more likely to accurately represent the pose of the robot. One such sample set may be selected from the plurality of subsets. Then, the pose of the robot may be estimated based on the selected sample set.

In one example, a method is provided that includes determining locations of a plurality of candidate landmarks in relation to a robot based on sensor data from at least one sensor on the robot. The method further includes determining a plurality of sample sets, wherein each sample set comprises a subset of the plurality of candidate landmarks and a plurality of corresponding mapped landmarks. The method also includes determining a transformation for each sample set that relates the candidate landmarks from the subset to the corresponding mapped landmarks. The method additionally includes applying the determined transformation for each sample set to the plurality of candidate landmarks to determine a number of inliers associated with each sample set based on distances between the transformed plurality of candidate landmarks and a plurality of neighbouring mapped landmarks. The method further includes selecting a sample set from the plurality based on the number of inliers associated with each sample set. The method still further includes estimating a pose of the robot based on the selected sample set.

In another example, a system is provided that includes a robot, at least one sensor coupled to the robot, one or more processors, and a non-transitory computer readable medium. The system further includes program instructions stored on the non-transitory computer readable medium and executable by the one or more processors to determine locations of a plurality of candidate landmarks in relation to the robot based on sensor data from the least one sensor coupled to the robot. The program instructions further determine a plurality of sample sets, wherein each sample set comprises a subset of the plurality of candidate landmarks and a plurality of corresponding mapped landmarks. The program instructions also determine a transformation for each sample set that relates the candidate landmarks from the subset to the corresponding mapped landmarks. The program instructions additionally apply the determined transformation for each sample set to the plurality of candidate landmarks to determine a number of inliers associated with each sample set based on distances between the transformed plurality of candidate landmarks and a plurality of neighbouring mapped landmarks. The program instructions further select a sample set from the plurality based on the number of inliers associated with each sample set. The program instructions still further estimate a pose of the robot based on the selected sample set.

In another example, a non-transitory computer readable medium is provided having stored therein instructions, that when executed by a control system of a mobile robotic device, cause the control system to perform functions. The functions include determining locations of a plurality of candidate landmarks in relation to a robot based on sensor data from at least one sensor on the robot. The functions further include determining a plurality of sample sets, wherein each sample set comprises a subset of the plurality of candidate landmarks and a plurality of corresponding mapped landmarks. The functions also include determining a transformation for each sample set that relates the candidate landmarks from the subset to the corresponding mapped landmarks. The functions additionally include applying the determined transformation for each sample set to the plurality of candidate landmarks to determine a number of inliers associated with each sample set based on distances between the transformed plurality of candidate landmarks and a plurality of neighbouring mapped landmarks. The functions further include selecting a sample set from the plurality based on the number of inliers associated with each sample set. The functions still further include estimating a pose of the robot based on the selected sample set.

In another example, a system is provided that includes means for determining locations of a plurality of candidate landmarks in relation to a robot based on sensor data from at least one sensor on the robot. The system further includes means for determining a plurality of sample sets, wherein each sample set comprises a subset of the plurality of candidate landmarks and a plurality of corresponding mapped landmarks. The system also includes means for determining a transformation for each sample set that relates the candidate landmarks from the subset to the corresponding mapped landmarks. The system additionally includes means for applying the determined transformation for each sample set to the plurality of candidate landmarks to determine a number of inliers associated with each sample set based on distances between the transformed plurality of candidate landmarks and a plurality of neighbouring mapped landmarks. The system further includes means for selecting a sample set from the plurality based on the number of inliers associated with each sample set. The system still further includes means for estimating a pose of the robot based on the selected sample set.

The foregoing summary is illustrative only and is not intended to be in any way limiting. In addition to the illustrative aspects, embodiments, and features described above, further aspects, embodiments, and features will become apparent by reference to the figures and the following detailed description and the accompanying drawings.

BRIEF DESCRIPTION OF THE FIGURES

FIGS. 11A, 11B, 11C, and 11D illustrate determination of inliers associated with a sample set of candidate landmarks and corresponding mapped landmarks, according to an example embodiment.

DETAILED DESCRIPTION

Figure 1:
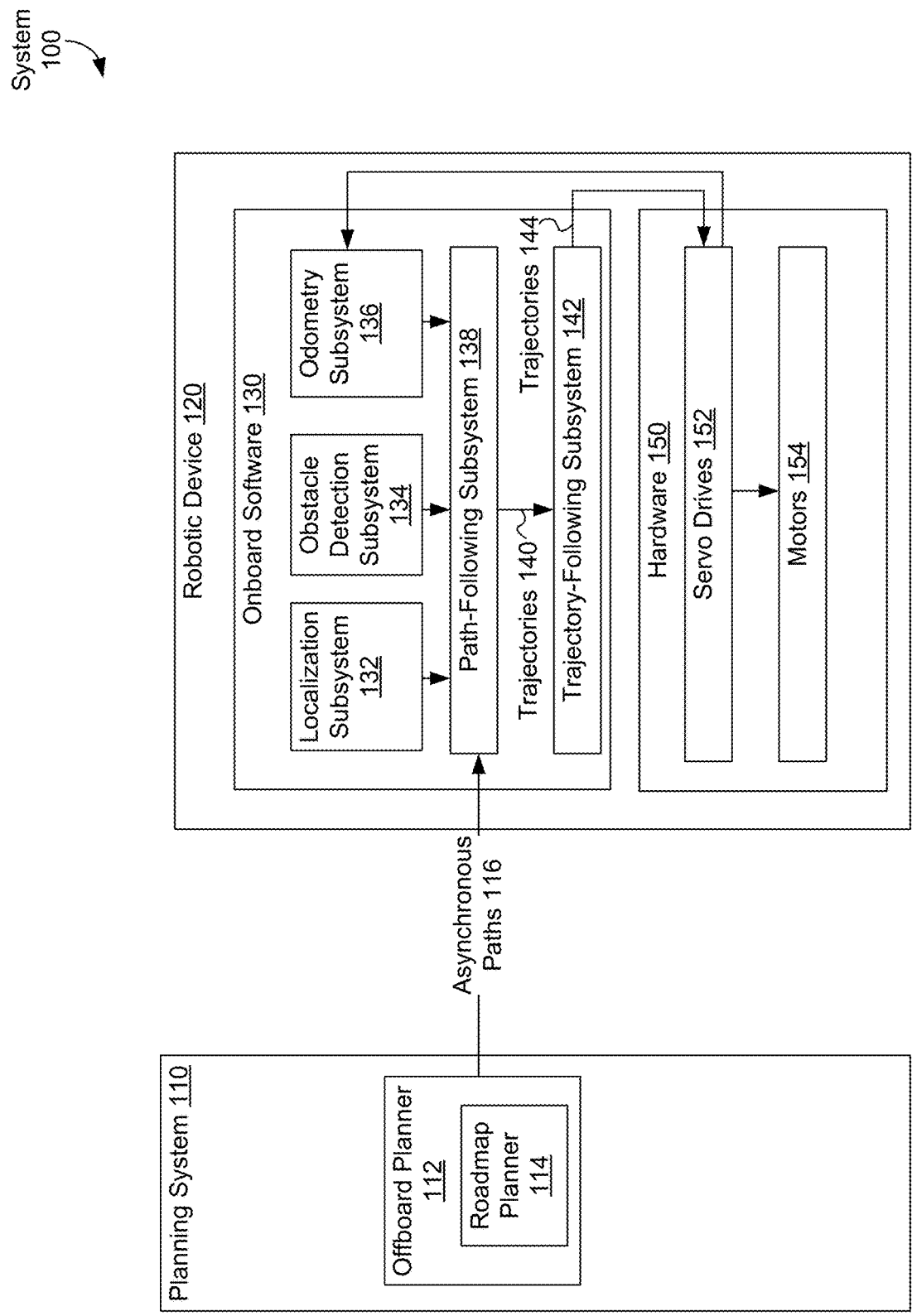
FIG. 1 is a block diagram of a system, in accordance with an example embodiment.

Example methods and systems are described herein. Any example embodiment or feature described herein is not necessarily to be construed as preferred or advantageous over other embodiments or features. The example embodiments described herein are not meant to be limiting. It will be readily understood that certain aspects of the disclosed systems and methods can be arranged and combined in a wide variety of different configurations, all of which are contemplated herein.

Furthermore, the particular arrangements shown in the Figures should not be viewed as limiting. It should be understood that other embodiments might include more or less of each element shown in a given Figure. Further, some of the illustrated elements may be combined or omitted. Yet further, an example embodiment may include elements that are not illustrated in the Figures.

I. Overview

Example embodiments may include or otherwise relate to methods and systems that may be used to estimate a pose of a robot within an environment of the robot and to thereby assist the robot in navigating through the environment. For example, one or more sensors of the robot may detect landmarks by receiving signals from landmarks within the environment. The robot may determine its location in relation to the landmarks based on the received signals. Further, the locations of the landmarks within the environment may be mapped. The robot may determine which mapped landmarks correspond to the detected landmarks. The robot may estimate its pose within the environment by transforming its location in relation to the detected landmarks into its location in relation to the corresponding mapped landmarks.

In some examples, the robot may receive or detect signals that are not associated with a landmark, or that misrepresent the location of a landmark. This type of received or detected signal may be referred to as a "false detection." False detections may cause the robot to inaccurately estimate its pose within the environment, and thus hinder the robot from navigating effectively through the environment. For example, the robot may erroneously associate certain mapped landmarks with the detected landmarks because the detected landmarks include one or more false detections. Based on this erroneous association, the robot may incorrectly estimate its pose within the environment and may navigate through the environment ineffectively.

Example systems and methods may help to simultaneously estimate the pose of the robot while filtering out false detections. To this end, detected landmarks may be treated as candidate landmarks, and the candidate landmarks may be vetted to determine which of them correspond to mapped landmarks, and which correspond to false detections.

Some examples may include sampling multiple subsets of the candidate landmarks (e.g., subsets of three candidate landmarks). Each sampled candidate landmark of a subset may then be paired with a corresponding mapped landmark. This process may help to vet the candidate landmarks because some sampled subsets will include false detections and others will not. Each sampled subset may be evaluated individually. These examples may further include determining a transformation to apply to the candidate landmarks of each subset. The transformation may align the sampled candidate landmarks of each subset with the corresponding mapped landmarks so that there is a minimal distance between the sampled candidate landmarks and the corresponding mapped landmarks. Using a subset of the candidate landmarks and corresponding mapped landmarks may decrease the computation required to determine the transformation.

Some examples may further include determining a number of inliers associated with each sampled subset. The transformation determined for each sampled subset may be applied to all of the candidate landmarks. The number of inliers for a sampled subset may be based upon distances between the transformed candidate landmarks and neighboring mapped landmarks. For example, the distances between the transformed candidate landmarks and neighboring mapped landmarks (e.g., closest mapped landmarks) may be compared to an inlier threshold distance. Transformed candidate landmarks with distances to neighboring mapped landmarks that are less than or equal to the inlier threshold distance may be referred to as "inliers." Transformed candidate landmarks with distances to neighboring mapped landmarks that are greater than the threshold value may be referred to as "outliers." An inlier may indicate that the transformed subset accurately aligned the associate candidate landmark with a neighboring mapped landmark, while an outlier may indicate the opposite. A sampled subset that includes no false detections is more likely to produce a transform that accurately aligns the candidate landmarks with neighboring mapped landmarks, and will in turn produce more inliers. Thus, determining the number of inliers may help to vet the candidate landmarks because a greater number of inliers may correspond to a sampled subset with few or no false detections, while a greater number of outliers may correspond to a subset that includes one or more false detections.

In some examples, subsets of the candidate landmarks and corresponding mapped landmarks may be sampled iteratively. These examples may include determining a number of inliers associated with each sampled subset, and selecting the subset with the highest number of inliers. In other examples, the first iteratively sampled subset that has an associated number of inliers that meets or exceeds an inlier threshold value may be selected. After a subset is selected, a transformation of the inliers associated with that subset may be used to estimate the pose of the robot. Because the inliers may be used to determine which subsets include false detections and may also be used to estimate the pose of the robot, the methods and systems described herein may simultaneously estimate the pose of the robot while filtering out false detections.

Further examples may include determining a pose estimation confidence. The pose estimation confidence may be based on the ratio of inliers associated with a subset to the total number of candidate landmarks. A ratio that is close to one may indicate that there are very few false detections, while a ratio that is close to zero may indicate that there are many false detections.

In still further examples, prior information may be available indicating an initial pose estimate of the robot. For example, the initial pose estimate may indicate that the robot was at coordinates (x, y) at time (t1). In these examples, the robot may sample subsets of the candidate landmarks and corresponding mapped landmarks based in part on the initial pose estimate of the robot. For example, the corresponding mapped landmarks may be selected from the mapped landmarks closest to coordinates (x, y).

Reference will now be made in detail to various embodiments, examples of which are illustrated in the accompanying drawings. In the following detailed description, numerous specific details are set forth in order to provide a thorough understanding of the present disclosure and the described embodiments. However, the present disclosure may be practiced without these specific details. In other instances, well-known methods, procedures, and components, and circuits have not been described in detail so as not to unnecessarily obscure aspects of the embodiments.

II. System Design for Robotic Devices

FIG. 1 is a block diagram of system 100, in accordance with an example embodiment. System 100 includes planning system 110 and robotic device 120. Planning system 110 can include offboard planner 112 that can coordinate motion of one or more robotic devices operating in an environment. Offboard planner 112 can include roadmap planner 114. Offboard planner 112 and/or roadmap planner 114 can generate one or more asynchronous paths 116 for a robotic device, such as robotic device 120, to follow while operating in an environment.

A roadmap graph, prototype graph, or other roadmap representing an environment, such as prototype graph 300 discussed below in the context of FIG. 3, can be received, determined, or otherwise provided to planning system 110, offboard planner 112 and/or roadmap planner 114. Asynchronous paths 116 can be one or more paths based on the roadmap graph, prototype graph, or other roadmap. For example, if the roadmap graph, prototype graph, or other roadmap has a plurality of edges that connect a plurality of intersections, asynchronous paths 116 can be specified in terms of the plurality of edges and/or the plurality of intersections.

In some examples, robotic device 120 can be any one or more steered vehicle(s) capable of following a path. For example, robotic device 120 can include onboard software 130 and/or hardware 150. Onboard software 130 can include one or more of: localization subsystem 132, obstacle detection subsystem 134, odometry subsystem 136, path-following subsystem 138, and trajectory-following subsystem 142. Localization subsystem 132 can be used to localize a robotic device, that is, determine a location of the robotic device within an environment. Localization subsystem 132 can generate position estimates of the robotic device and/or other objects that can be used to localize the robotic device, assist the robotic device in following a path, such as asynchronous paths 116, and/or assist the robotic device in following a trajectory, such as trajectories 140. Once the position estimates are generated, localization subsystem 132 can provide the position estimates to path-following subsystem 138.

An asynchronous path, or path for short, can be a time-invariant plan or other information indicating how robotic device 120 can travel from a starting point SP to an ending point EP; i.e., an (asynchronous) path does not take time into account. In contrast, a trajectory can include values of a steering angle and of traction motor velocity that robotic device 120 can follow for a planning time interval.

The planning time interval can be a duration of time during which a robotic device is guided, or planned, to follow a path, route, and/or travel. In some embodiments, the planning time interval can be a predetermined amount of time; e.g., five seconds, one second, 0.2 seconds, 0.1 seconds. In particular, a predetermined planning time interval can be determined based on a user input that specifies a value for the planning time interval. In other embodiments, the planning time interval can be determined based on one or more other values; e.g., a stitch time, a time associated with a uniform edge (or path) cost, an estimated time to travel along a trajectory. Other techniques for determining the planning time interval and values for the planning time interval are possible as well.

Then, one or more trajectories can be used to describe how robotic device 120 can travel from starting point SP to an ending point EP in a time-variant manner. In some embodiments, a trajectory can also provide information about values of other variables than a steering angle and a traction motor velocity over the planning time interval, such as, but not limited to, other kinematic variables (e.g., velocity and acceleration) of robotic device 120, and actuator positions of robotic device 120.

As an example, a path to drive a car from a location "home" to a location "work" may include an ordered listing of streets that a control entity, such as a person or control device of an autonomous vehicle, can use to drive the car from home to work. In this example, a trajectory from home to work can involve one or more instructions specifying velocity and/or acceleration that the control entity can use to drive the car from home to work. In some examples, the trajectory can take traffic, obstacles, weather, and other time-sensitive conditions into account; e.g., the trajectory to go from home to work can indicate that the control entity "turn right for 10 seconds at 20 MPH or less", "accelerate to 55 MPH and drive straight for 3 minutes", "slow to 20 MPH within 30 seconds", "turn left for 10 seconds at 20 MPH or less", etc. In some embodiments, the trajectory can be changed along the way; e.g., to account for obstacles, changes in path, etc.

Obstacle detection subsystem 134 can determine whether one or more obstacles are blocking a path and/or a trajectory of robotic device 120. Examples of these obstacles can include, but are not limited to, pallets, objects that may have fallen off a pallet, robotic devices, and human operators working in the environment. If an obstacle is detected, obstacle detection subsystem 134 can provide one or more communications indicating obstacle detection to path-following subsystem 138. The one or more communications indicating obstacle detection can include location information about one or more positions of one or more obstacles detected by obstacle detection subsystem 134 and/or identification information about the one or more obstacles detected by obstacle detection subsystem 134. Odometry subsystem 136 can use data, such as data from servo drives 152, to estimate one or more changes in position of robotic device 120 over time.

Path-following subsystem 138 and/or trajectory-following subsystem 142 can act as a planner aboard robotic device 120. This onboard planner can follow one or more paths, such as asynchronous paths 116, based on position estimates provided by localization subsystem 132.

Path-following subsystem 138 can receive asynchronous paths 116, position estimate inputs from localization subsystem 132, location information about one or more positions of one or more obstacles from obstacle detection subsystem 134, and/or information about one or more changes in position from odometry subsystem 136, and generate one or more trajectories 140 as outputs.

Hardware 150 can include servo drives 152 and/or motors 154. Servo drives 152 can include one or more servomechanisms and related electrical equipment. In some examples, servo drives 152 can include one or more electronic amplifiers used to power the one or more servomechanisms and/or to monitor feedback signals from the servomechanism(s). Servo drives 152 can receive control signals, such as trajectories 144, from onboard software 130, and can provide electric current to the servomechanism(s) to produce motion proportional to the control signals. In some embodiments, servo drives 152 can compare status information received from the servomechanism(s) with an expected status as commanded by trajectories 144. Then, servo drives 152 can adjust a voltage frequency or pulse width of the provided electric current to correct for deviations between received status information and an expected status. In other embodiments, servo drives 152 can provide information, such as the feedback signals and/or location-related information, to onboard software 130.

One or more motors 154 can be part or all of the servomechanism(s) of servo drives 152. For example, motors 154 can use the electric current provided by servo drives 152 to generate mechanical force to drive part or all of robotic device 120; e.g., motors 154 can provide force to propel robotic device 120 and/or drive one or more effectors of robotic device 120.

Path planning of robotic devices within an environment, such as an environment that includes indoor settings, such as a warehouse, office building, or home, and/or outdoor settings, such as a park, parking lot, or yard, can be performed with respect to a roadmap graph, which is a connected graph of paths that agents, such as robotic devices, may follow. Using roadmap graphs to plan agent routing within the environment rather than taking a free-space approach can reduce a total planning state space and so making large-scale multi agent coordination tractable. Further, the use of roadmap graphs can enable operators to intuitively control areas in which robotic devices are allowed to navigate.

Roadmap graph generation can first involve generation of a prototype graph, which indicates the rough position of lanes and directions of travel. In some examples, a prototype graph can be a directed graph that indicates lanes and directions of travel of robotic devices. In other examples, a prototype graph can be generated manually based on a map or drawing of the environment.

Figure 2:
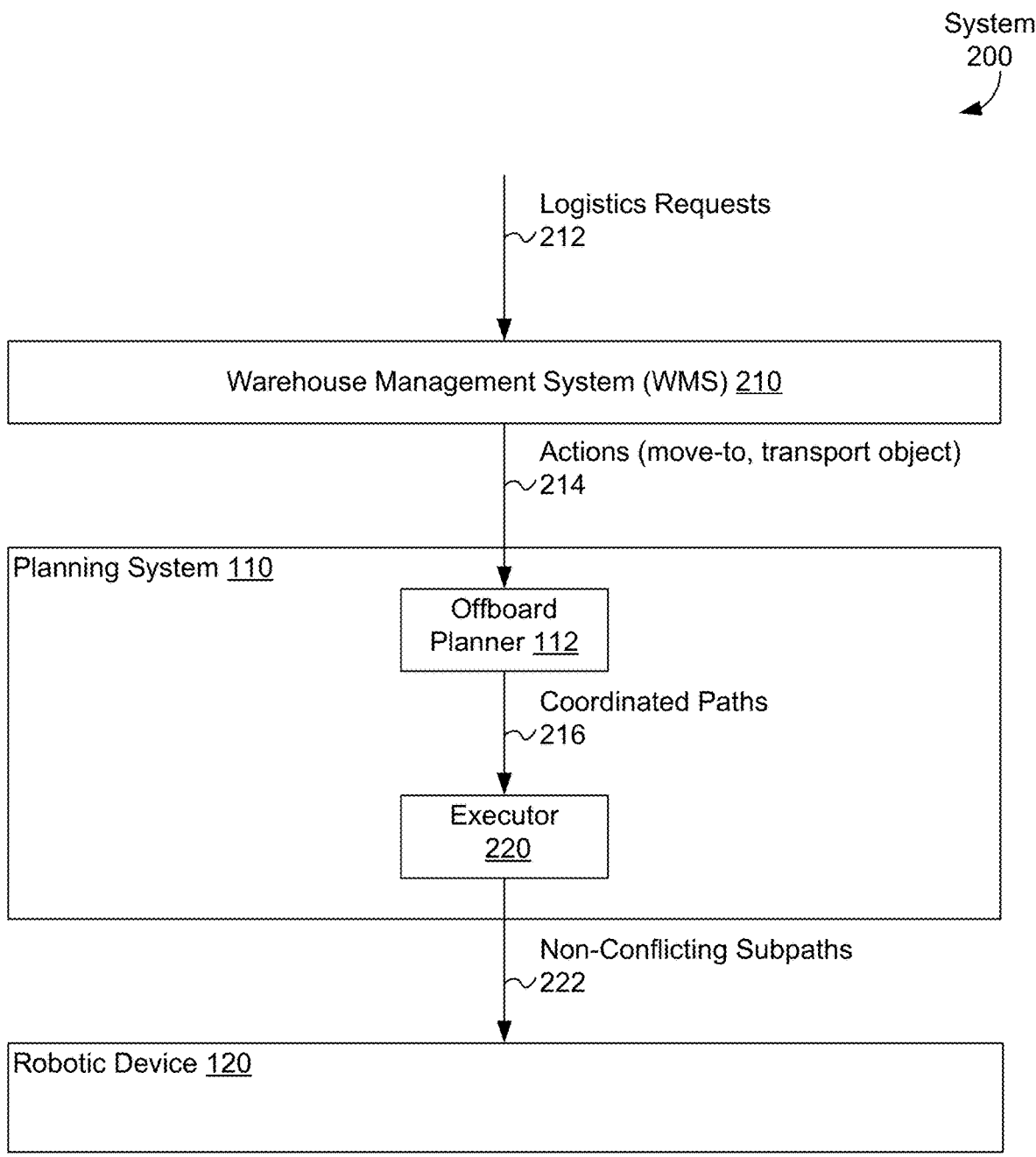
FIG. 2 depicts a system for operating one or more warehouses, in accordance with an example embodiment.

FIG. 2 depicts system 200 for operating one or more warehouses, in accordance with an example embodiment. System 200 includes warehouse management system 210, planning system 110, and robotic device 220. Warehouse management system 210 can receive one or more logistics requests 212 associated with the warehouse; e.g., requests to store one or more items in the warehouse and/or requests to ship one or more items from the warehouse. Warehouse management system 210 can translate logistics requests 212 into one or more actions 214, where actions 214 can include, but are not limited to, a "move-to" action to move one or more designated agents to one or more designated locations, and a "transport" action to carry one or more items to one or more designated locations. In some examples, actions 214 can include go-to commands of the form {agent ID, destination}, but other actions are possible such as "move pallet". These are typically decomposable into move-to commands, however (move to pick location, move to place location).

Planning system 110 includes offboard planner 112 and executor 220. Offboard planner 112 can receive actions 214 as inputs and generate one or more coordinated paths 216 for one or more agents operating in a warehouse; e.g., multiple robotic devices, to carry out actions 214. Coordinated paths 216 can be part of a coordinated action plan for all agents in the warehouse to fulfill logistics requests 212. The coordinated action plan can take precedence of agents into account; e.g., if robotic devices RD1 and RD2 are both expected to reach a point at approximately the same time, one of the robotic devices can have precedence or priority over the other, such as robotic device RD1 waiting for robotic device RD2 to pass through the point (or vice versa). Executor 220 can receive coordinated paths 216 and generate non-conflicting sub-paths 222 to direct robotic device 120 in accomplishing its part of the coordinated action plan to carry out actions 214 to fulfill logistics requests 212.

As illustrated above in FIG. 2, planning system 110, which includes offboard planner 112 and executor 220, can communicate with robotic device 120. In some embodiments, the robotic device can be a fork truck; for example, any Occupational Safety and Health Administration (OSHA) Class 1 or Class 3 powered industrial truck. In other embodiments, planning system 110 can includes software that executes using one or more networked computing devices located in the "cloud" (e.g., one or more networked computing devices) and/or located somewhere on a premises co-located with robotic device 120.

In some embodiments, offboard planner 112 and executor 220 can be synchronized. In an example embodiment, offboard planner 112 and executor 220 can be implemented on one device; e.g., in planning system 110 or robotic device 120, and synchronized within the device. In another example embodiment, offboard planner 112 and executor 220 can act synchronously in one or more devices.

Figure 3:
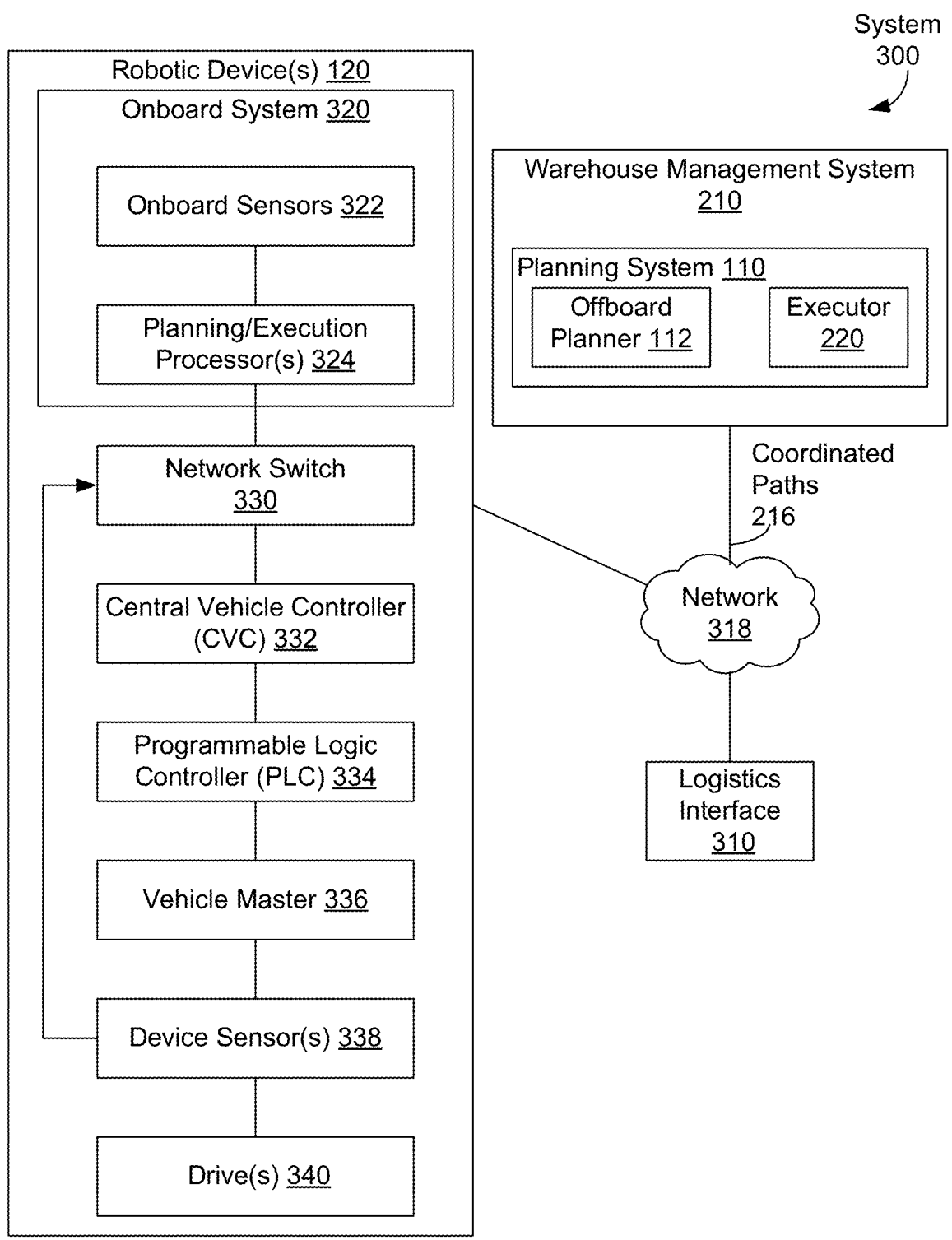
FIG. 3 illustrates a system, in accordance with an example embodiment.

FIG. 3 illustrates a system 300 that includes logistics interface 310, warehouse management system 210, and one or more robotic devices 120 connected using network 318, in accordance with an example embodiment. Logistics interface 310 can provide inventory task instructions to warehouse management system 210 via network 318 regarding movement of objects, such as pallets, and/or robotic devices to warehouse management system 210. An example inventory task can be to move pallet A containing items of type B to location C.

Warehouse management system 210 can receive the inventory task instructions from logistics interface 310 and generate one or more task/mission instructions (e.g., an instruction to robotic device A to move pallet B from location C to location D) and/or plans for controlling robotic device(s) 120 to carry out the inventory task instructions. The task/mission instructions and/or plans can include information about one or more paths and/or one or more trajectories, where the task/mission instruction(s), plan(s), path(s) and trajectory/trajectories are generated by planning system 110 of warehouse management system 210 using the techniques discussed in the context of FIGS. 1 and 2.

For example, warehouse management system 210 can be a centralized control service running on and storing data using one or more computing devices; e.g., server computing devices. To perform these tasks, warehouse management system 210 can include WMS middleware and can provide a user interface to provide access to tools for monitoring and managing system 300. The WMS middleware and/or other components of warehouse management system 210 can use one or more application programming interfaces (APIs), such as protocol conversion APIs for conversion between task/mission instructions (e.g., an instruction to robotic device A to move pallet B from location C to location D) to robotic device paths, poses, and/or trajectories; conversion between inventory tasks and task/mission instructions; and conversions between APIs.

The user interface provided by warehouse management system 210 can provide one or more user interface functions for system 300, including, but not limited to: monitoring of robotic device(s) 120, e.g, presenting data related to location, battery status, state of charge, etc. of one or more robotic devices; enabling generation and sending of inventory task instruction(s), task/mission instruction(s), plan(s), path(s) and/or trajectory/trajectories to one or more of robotic device(s) 120; and reviewing, updating, deletion, and/or insertion of data related to one or more warehouse maps, pallets, networks, and/or planning systems (e.g., planning system 110, warehouse management system 210, and/or logistics interface 310).

In some embodiments, warehouse management system 210 can route communications between logistics interface 310 and robotic device(s) 120 and between two or more of robotic device(s) 120 and manage one or more onboard systems, such as onboard system 320 aboard one or more of robotic device(s) 120. In other embodiments, warehouse management system 210 can store, generate, read, write, update, and/or delete data related to system 300, such as, but not limited to: data regarding completion of a task/mission instruction by one or more of robotic device(s) 120; data regarding locations and/or poses of some or all of robotic device(s) 120, including data indicating a location where a robotic device was initialized/booted; data related to one or more audit trails for human actions, incident analysis, and/or debugging; and data for state tracking. In other embodiments, warehouse management system 210 can include a central message router/persistence manager that communicates with robotic device(s) 120 and one or more adapters. Each of the one or more adapters can provide access to data and/or communications of system 300 available to warehouse management system 210, and can include, but are not limited, to: a user interface service adapter for the above-mentioned user interface, a web content service adapter enabling World Wide Web (WWW)/Internet access to information about system 300, a message proxy adapter and/or a WMS adapter to act as intermediaries between communications between APIs and/or the WMS.

FIG. 3 shows that each of the one or more robotic devices 120 can include one or more of: onboard system 320, network switch 330, vehicle controller 332, programmable logic controller (PLC) 334, one or more device sensors 338, and one or more drives 340.

Onboard system 320 can be a computation and sensor package for robotic planning configured for installation into and use with robotic device 120, where onboard system 320 can include onboard sensors 322 and one or more planning/execution processors 324. FIG. 3 also shows that onboard system 320 that is configured to use network switch 330 at least to communicate with planning system 110 (via network 318), with device sensors 338, and/or with one or more actuators of robotic device 120.

Onboard system 320 can be responsible for one or more of: localization of robotic device 120, generation of local trajectories to carry out plans and/or travel along paths and/or trajectories provided by warehouse management system 210, generation of commands to drives 340 to follow one or more (local) trajectories, generation of commands to control actuator(s) of robotic device 120, and reporting pose, status and/or other information to warehouse management system 210.

Onboard sensors 322 can include one or more navigation lasers, laser scanners, cameras, and/or other sensors for navigating and/or controlling onboard system 320. For example, a robotic device of robotic device(s) 120 can include one or more laser scanners, such as one or more laser scanners provided by SICK AG of Waldkirch, Germany, HOKUYO AUTOMATIC CO. LTD of Osaka, Japan, and/or KEYENCE CORPORATION of Osaka, Japan. The laser scanners can be used for obstacle detection and/or avoidance along a direction of travel of the robotic device as well as along the sides, corners, and/or back of the robotic device. The laser scanners can also be used to localize the robotic device using reflector-based localization. In some embodiments, cameras and/or other sensors can be used for obstacle detection, obstacle avoidance, and/or localization instead of or along with the laser scanners.

Planning/execution processor(s) 324 can include one or more computer processors connected at least to onboard sensors 322. Planning/execution processor(s) 324 can read data from onboard sensors 322, generate local trajectories and/or commands to drive(s) 340 to move robotic device 120, and communicate with warehouse management system 210. A local trajectory can be a trajectory where robotic device 120 starts at a starting pose and reaches an ending pose at some time. In some examples, the starting pose can be implicitly specified; e.g., the starting pose can be a current pose of robotic device 120 and so the local trajectory be based on an assumption that its starting pose is the current pose of robotic device 120.

Planning/execution processor(s) 324 can utilize a component framework. The component framework can be a multi-threaded job scheduling and message passing system built on software libraries for input/output (I/O) and signaling configured to provide a consistent asynchronous model of robotic device 120, such as the "boost::asio" and "boost::signals2" software libraries provided by boost.org of Onancock, Va. The component framework can enable communication between software components (or modules) so that the software components can be executed in parallel in a thread safe manner.

The component framework can include one or more of: a state machine component, a localization component, a planning component, and a trajectory following component. The state machine component can manage a state of robotic device 120 for vehicle initialization, vehicle commanding and fault handling. The state machine component can use a deterministic finite automaton or other state machine to manage the state of the robotic device.

The localization component can read data from vehicle sensors and integrate prior state information of robotic device 120 to determine a pose of robotic device 120. The vehicle sensor data may be indicative of one or more landmarks/points of interest detected by the vehicle sensors. Alternatively, the data from the vehicle sensors may require processing such that the localization component detects the one or more landmarks/points of interest based on the vehicle sensor data. The pose can be determined relative to the one or more detected landmarks/points of interest, such as pallets or other objects. The planning component can receive one or more objectives from warehouse management system 210 and determine a local trajectory for robotic device 120 to achieve those objectives. In some embodiments, the local trajectory can be a short-term trajectory that robotic device 120 is to follow for a predetermined amount of time; e.g., 100 milliseconds, 200 milliseconds, 500 milliseconds, 1 second, 5 seconds. The trajectory following component can receive the local trajectory generated by the planning component, and generate drive control instructions to travel along the local trajectory. The drive control instructions that are then relayed to drives 340 that control a traction motor and other actuators for robotic device 120.

Network switch 330 can enable communications for robotic device(s) 120. These communications can include, but are not limited to, communications between onboard system 320 and the rest of robotic device 120; e.g, device sensors 338 and drives 340, and communications with warehouse management system 210 via network 318. For example, network switch 330 can enable Transmission Control Protocol/Internet Protocol (TCP/IP)-based communications over Ethernet and/or other wireline communications interface(s) to a wireline network and/or over Wi-Fi™ and/or other wireless communications interface(s) to a wireless network, such as a PLANET Ethernet Switch by PLANET Technology Corporation of New Taipei City, Taiwan.

In some embodiments, communications between robotic device(s) 120 and planning system 110 can include remote procedure calls (RPCs). The remote procedure calls can allow invocation of software procedures, methods, and/or functions resident on one or more of robotic device(s) 120 by software of planning system 110 and vice versa. The remote procedure calls can be based on a communications protocol, such as TCP/IP, a HyperText Transfer Protocol (HTTP) such as HTTP 1.0 and/or HTTP 2.0, and/or another communications protocol. Some or all of the remote procedure calls can include encrypted data; such data may be encrypted using the Secure Sockets Layer (SSL), Transport Layer Security (TLS), and/or one or more other encryption algorithms and/or protocols. In embodiments where encrypted data is used, one or more certification authorities, such as a private certification authority, can authenticate one or more certificates used in encrypting and/or decrypting the encrypted data. A certificate authority can use an access control list (ACL) to control access to the one or more certificates. The remote procedure calls can use a request/response protocol and/or a bidirectional streaming protocol for RPC-related communications. In embodiments where the bidirectional streaming protocol is used for RPC-related communications, a single long-lived RPC can be used to implement the bidirectional streaming protocol.

Vehicle controller 332 and/or programmable logic controller 334 can provide electrical and sensor management functionality for robotic device(s) 120. The electrical and sensor management functionality can include, but is not limited to, functionality for electrical load control, lighting control, sensor control, sensor and/or switch signal processing, and power management. Vehicle master 336 can provide functionality for controlling one or more actuators, such as lift devices, of robotic device(s) 320.

Device sensor(s) 338 can include one or more sensors that can provide data related to controlling and/or operating robotic device(s) 120. The data can provide information about an environment about robotic device(s) 120, such as but not limited to, localization information, position estimates, and mapping data. For example, device sensor(s) 338 can include one or more lasers (e.g., two-dimensional (2D) lasers, safety lasers, laser scanners), cameras (e.g., Time-of-Flight (ToF) cameras, Red-Green-Blue (RGB) cameras, thermal cameras), electrical sensors, proximity sensors, navigational devices, and location sensors.

Drive(s) 340 can include one or more drive controllers and/or actuators that provide functionality for moving robotic device(s) 120. The drive controllers can direct the drive actuators to control movement of robotic device(s) 120. The drive actuators can include one or more traction motors, electric drives, hydraulic drives, and pneumatic drives.

Figure 4:
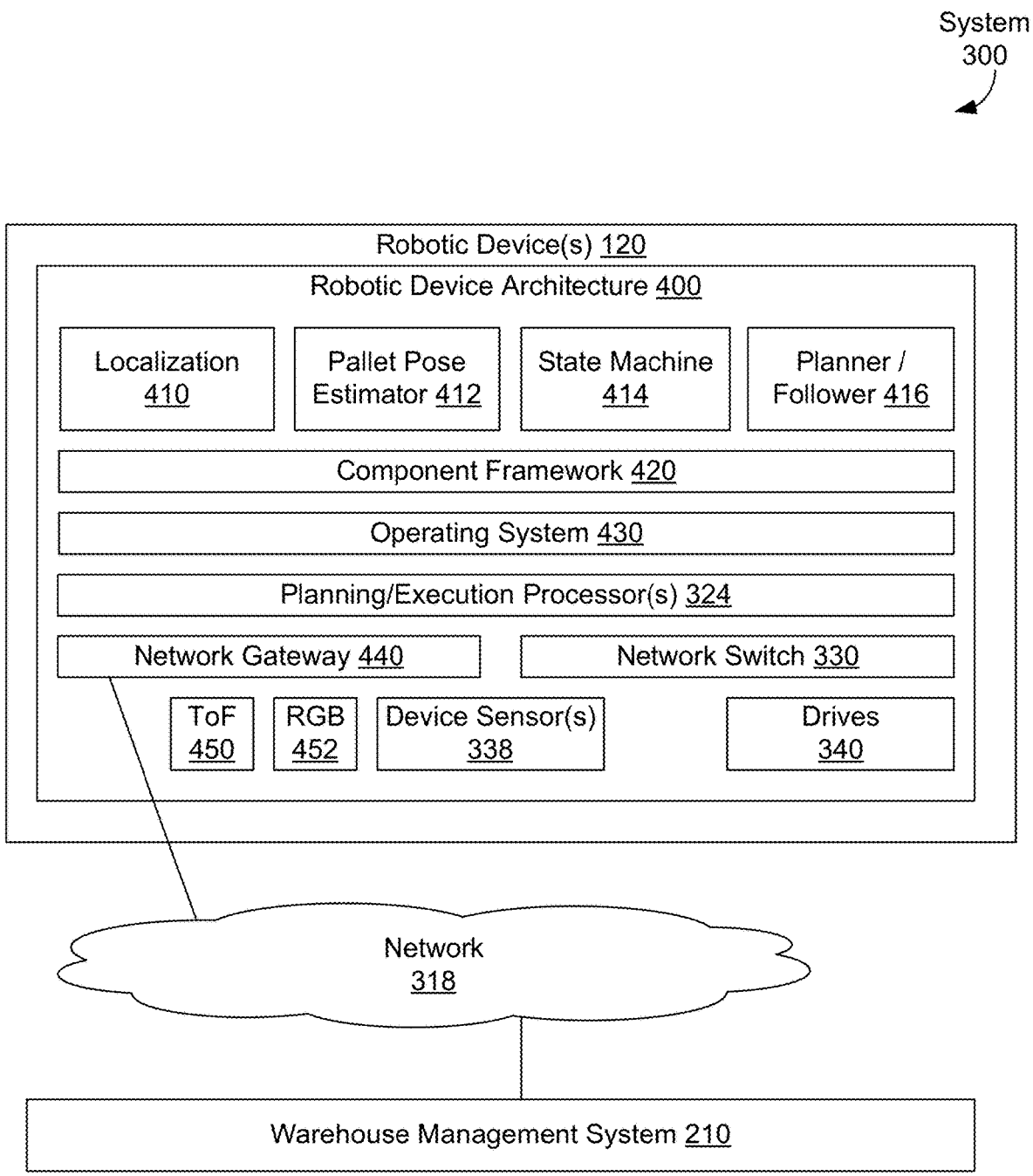
FIG. 4 illustrates a robotic device architecture for one or more robotic devices, in accordance with an example embodiment.

FIG. 4 illustrates robotic device architecture 400 of robotic device(s) 120, in accordance with an example embodiment. Robotic device architecture 400 of robotic device(s) 120 can include software. The software can include software for localization 410, software for a pallet pose estimator 412, software related to state machine 414, software for planner follower 416, software for component framework 420 and software for operating system 430. The software can be executed by one or more hardware planning/execution processors 324. Communications between robotic device(s) 120 and other devices can be carried out using network gateway 440 and/or network switch 330. For example, network gateway 440 can be used for wireless communications with and within a robotic device of robotic device(s) 120 and network switch 330 can be used for wireline communications with and within a robotic device of robotic device(s) 120. Robotic device architecture 400 also includes additional hardware such as device sensor(s) 338 and drive(s) 340 discussed above in the context of FIG. 3. In some embodiments, robotic device architecture 400 can include one or more cameras, including but not limited to, ToF camera 450 and RGB camera 452, where the one or more cameras can include one or more still cameras and/or one or more video cameras.

Figure 5:
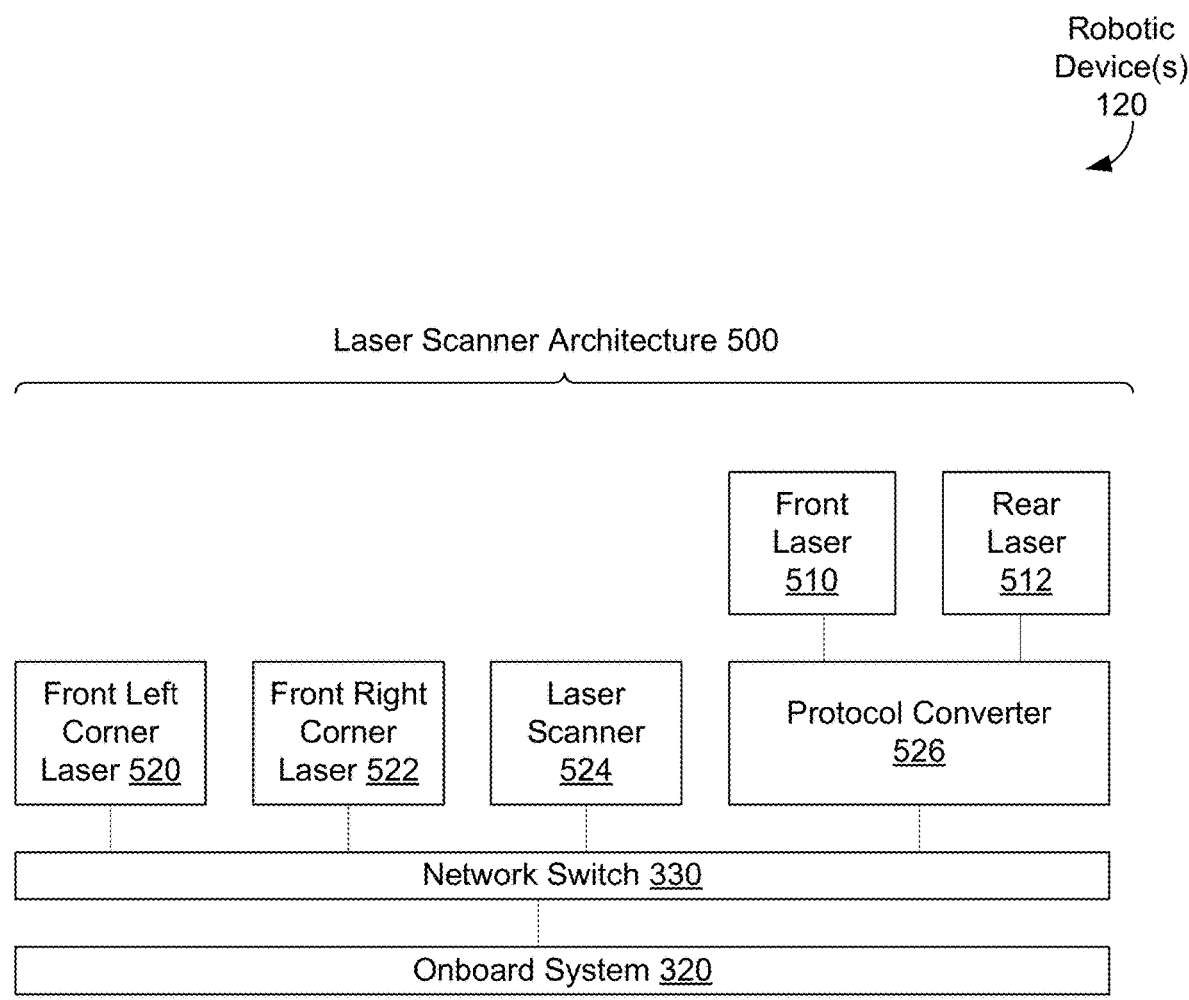
FIG. 5 illustrates a laser scanner architecture for one or more robotic devices, in accordance with an example embodiment.

FIG. 5 illustrates laser scanner architecture 500 for robotic device(s) 120, in accordance with an example embodiment. In some embodiments, some or all of device sensor(s) 338 can be lasers and laser scanners illustrated by laser scanner architecture 500.

Laser scanner architecture 500 can include lasers 510, 512, 520, 522, laser scanner 524, protocol converter 526, network switch 330, and onboard system 320. Lasers 510, 512, 520, and 522 can be located at fixed positions of robotic device(s) 120; for example, laser 510 can be located at the front of a robotic device, laser 512 can be located at the rear of the robotic device, laser 520 can be located at a front left corner of the robotic device, and laser 522 can be located at a front right corner of the robotic device. Lasers 510, 512, 520, 522, and/or laser scanner 524 can provide information to localize the robotic device within an environment. In some embodiments, lasers 510, 512, 520, 522, and/or laser scanner 524 can emit light that is reflected off of one or more reflectors—the reflected light can be detected by one or more laser sensors, and the robotic device can be localized within the environment based on a duration of time taken to detect the reflected light. In particular of these embodiments, some or all of lasers 510, 512, 520, 522, and/or laser scanner 524 can include one or more laser sensors for detecting reflected laser light. Then, some or all of lasers 510, 512, 520, 522, and/or laser scanner 524 can generate data, including but not limited to, data related to a laser (e.g., maintenance data for the laser), data related to light emitted by the laser, and data related to one or more durations of time taken to detect reflected laser light by the laser sensor(s).

As illustrated in FIG. 5, some lasers, such as lasers 520, 522, and laser scanner 524 can be directly connected to network switch 330, while other lasers, such as lasers 510, 512, can be connected to network switch 330 via protocol converter 526. Protocol converter 526 can convert a communications protocol used by a laser, such as laser 510 and/or 512, to a communications protocol used by network switch 330; e.g., convert from a communications protocol based on RS-422 to a communications protocol based on Ethernet. Then, lasers 510, 512, 520, 522, and laser scanner 524 can send data to and receive commands from onboard system 320 via network switch 330 and perhaps protocol converter 526.

In some embodiments, robotic device(s) 120 can be subject to one or more failure conditions. Examples of those failure conditions and related recovery strategies are described in Table 1 below.

TABLE 1

| Name | Summary | Recovery Strategy |
| --- | --- | --- |
| Stale Localization | Localization system is unable to determine robotic device pose and/or localization certainty estimate has exceeded bounds. | Robotic device will halt and notify human operator. The operator can intervene by manually driving robotic device to a location for re-localization and reengaging. |

TABLE 1-continued

| Name | Summary | Recovery Strategy |
| --- | --- | --- |
| Trajectory Following | Trajectory following error exceeds threshold. | Robotic device will halt and attempt to restart trajectory following automatically. If system fails twice in a row then human operator will be notified. The operator can intervene by manually driving robotic device back onto roadmap. |
| No Safe Trajectory | Due to obstacle proximity, the trajectory planner cannot find a safe trajectory that would keep the robotic device a safe distance from known obstacles. | Robotic device will halt and notify human operator. The operator can intervene by manually driving robotic device around obstacle. |
| Hardware Fault | Steering/traction drive fault or other low-level hardware I/O fault condition | Robotic device will halt and notify human operator. The operator can power-cycle and manually drive robotic device back onto roadmap. |
| Pallet Detection Failure | Robotic device expected to discover a pallet at commanded location; no pallet was found | Robotic device will send message to a control service that includes sensor data relative to where the pallet was expected to be discovered. The control service will notify human operator and optionally may send pallet pose information manually. |
| Pallet Pose Estimation Failure | Robotic device could not determine pose of pallet relative to robotic device at high confidence. | Robotic device will send message to a control service that includes sensor data relative to where the pallet was expected. The control service will notify human operator and send pallet pose information manually. |

III. Localization of Robotic Devices within an Environment

Figure 6:
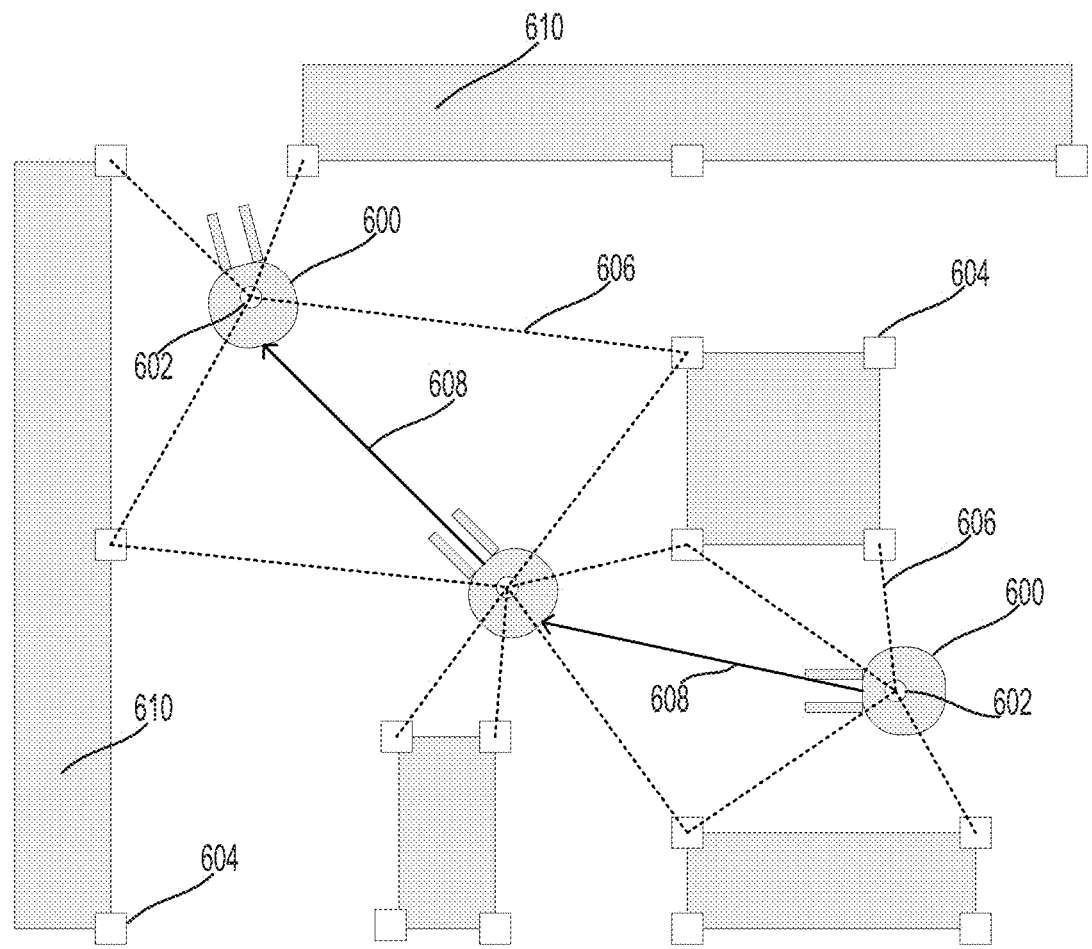
FIG. 6 shows a robot navigating within an environment, according to an example embodiment.

FIG. 6 shows a robot navigating within an environment, according to an example embodiment. A location and orientation of a robot 600 may be estimated, and the robot may navigate through the environment accordingly. The location and orientation of the robot may be referred to as the "pose" of the robot. The pose of the robot may be estimated based on received signals 606 by one or more sensors 602 of the robot. The received signals may be associated with landmarks 604 distributed throughout the environment. For example, the signals may be reflected by retroreflective markers placed in various locations in a warehouse. In this example, the robot may include a light ranging and detection (LIDAR) unit that emits light to an area surrounding the robot, and retroreflectors positioned in the area surrounding the robot may reflect the light back to the robot for detection by the one or more sensors of the robot.

In some examples, the received signals may indicate locations of the landmarks relative to the robot. Further, the locations of the landmarks within the environment may be predetermined. For example, the landmarks may be mapped. Matching the received signals with corresponding mapped landmarks may allow the pose of the robot within the environment to be inferred. For example, the robot may align the detected landmarks with the mapped landmarks to determine its position on the map. Further, the locations of the landmarks in relation to obstacles 610 within the environment may be predetermined. For example, the locations of obstacles may also be mapped. The robot may make movements 608 to navigate within the environment while avoiding the obstacles based on the estimated pose and the predetermined locations of the obstacles.

Figure 7:
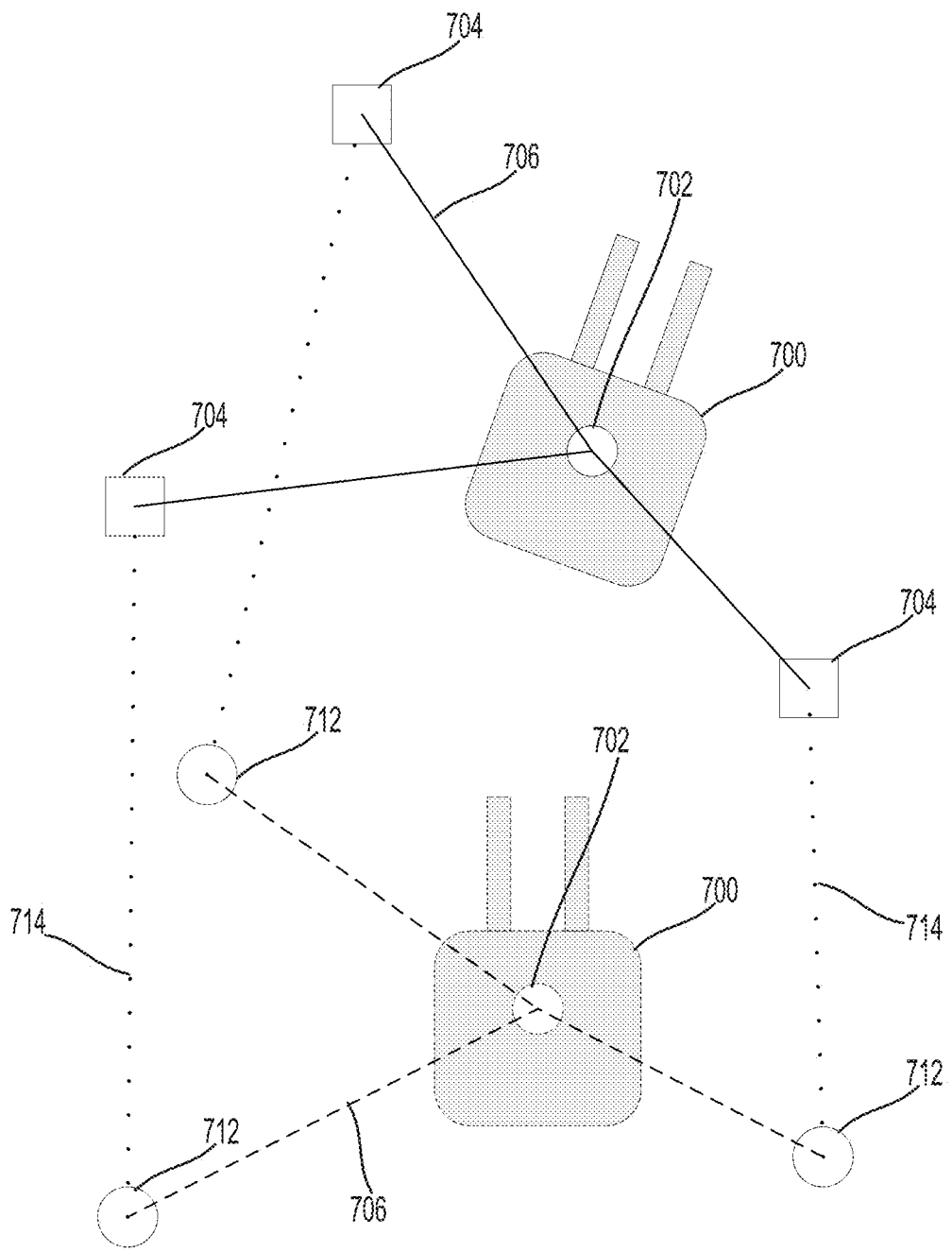
FIG. 7 shows a robot associating detections with mapped landmarks, according to an example embodiment.

FIG. 7 shows a robot associating detections with mapped landmarks, according to an example embodiment. Detected signals 706 from candidate landmarks 712 may be received by one or more sensors 702 of a robot 700. The signals may be indicative of locations of the candidate landmarks in relation to the robot. The candidate landmarks may be transformed to align with mapped landmarks 704. Associations 714 may be formed between the candidate landmarks and the mapped landmarks that result in a minimal distance between the transformed candidate landmarks and the mapped landmarks. For example, the associations 714 may be formed using a least means squared method such as an iterative closest point (ICP) method. The candidate landmarks may be translated and rotated based on the associations 714 between the candidate landmarks and the mapped landmarks. The pose of the robot may be inferred by similarly translating and rotating the robot.

Figure 8:
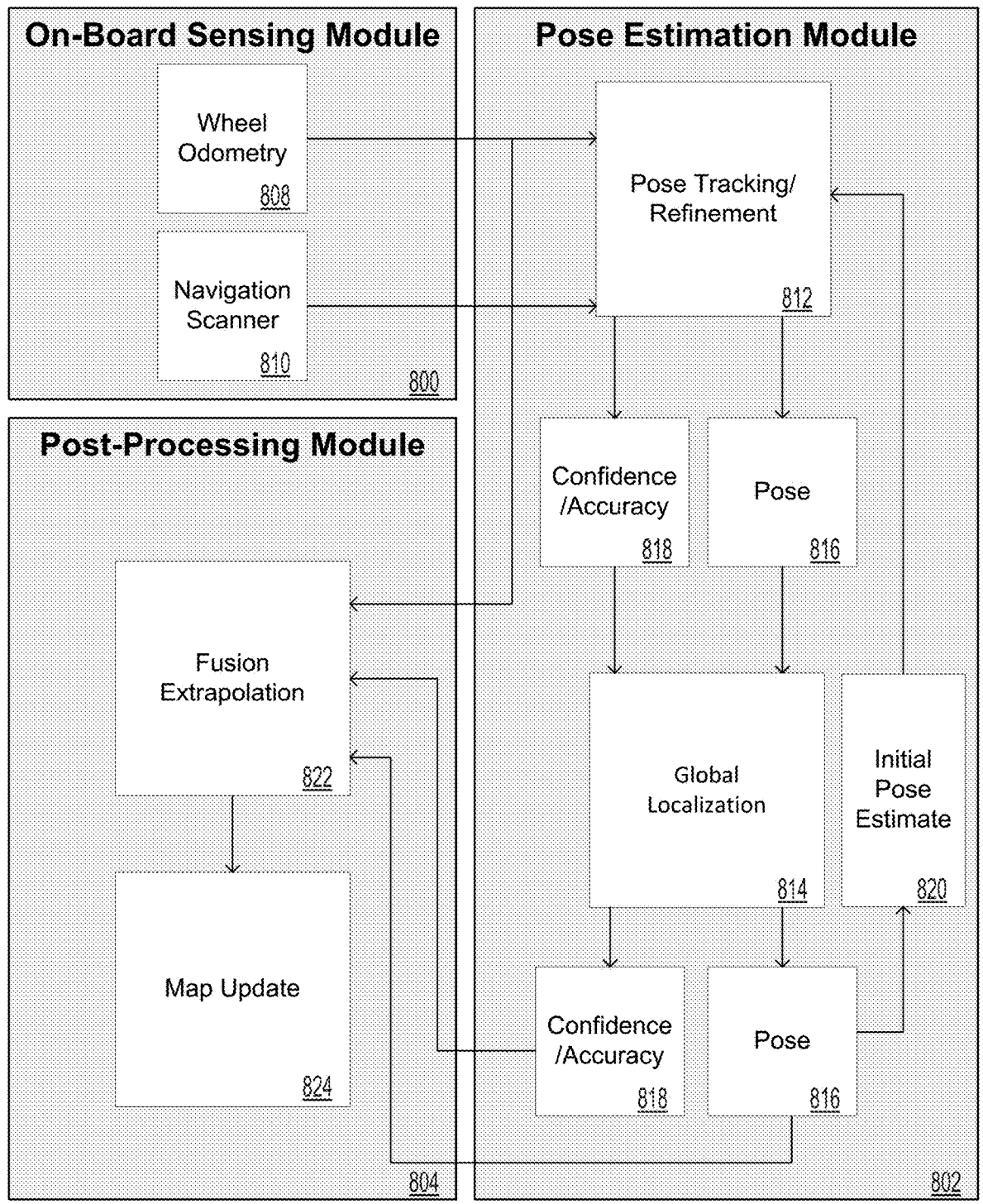
FIG. 8 is a functional block diagram illustrating modules of a robot control system, according to an example embodiment.

FIG. 8 is a functional block diagram illustrating modules of a robot control system, according to an example embodiment. The robot control system may include one or more sensors as part of an on-board sensing module 800. The sensors may provide data that is indicative of wheel odometry 808 of the robot. The sensors may also include a navigation scanner 810. The navigation scanner 810 may be configured to receive signals from candidate landmarks in an environment of the robot.

A pose estimation module 802 of the robot control system may indicate the location and orientation of the robot with respect to mapped landmarks in the environment. The pose estimation module 802 may include software that performs functions based on inputs from the on-board sensing module 800. For example, each time the navigation scanner 810 performs a scan, sensor data from the on-board sensing module may be processed by the pose estimation module 802 to determine a current location and orientation of the robot in the environment. The pose tracking/refinement block 812 and global localization block 814 of the pose estimation module 802 represent processing steps, while the pose block 816, confidence/accuracy block 818, and initial pose estimate block 820 represent outputs of the processing blocks 812 and 814.

The pose estimation module 802 may operate in two modes. In a first mode, the pose estimation module 802 may have an initial pose estimate 820 of the robot, and the pose tracking/estimate block 812 may update the initial pose estimate 820. The pose tracking/refinement 812 may utilize the wheel odometry 808 and data from the navigation scanner 810 in conjunction with the initial pose estimate 820 to identify the location of the robot in relation to candidate landmarks. The pose tracking/refinement block 812 may associate the candidate landmarks to particular mapped landmarks that are near to the initial pose estimate 820. The pose estimation module 802 may further provide a pose estimate 816 based on the association, and a confidence/accuracy 818 of the pose estimate. The confidence/accuracy 818 may indicate that the initial pose estimate is adequate, or that it requires further refinement. Also in the first mode, the pose 816 and confidence/accuracy 818 determined by the pose tracking/refinement block 812 may be used in the post-processing module 804 to determine a refined pose estimate of the robot. Meanwhile, the global localization block 814 may be skipped. Further, the pose estimate 816 derived during pose tracking/refinement 812 may be treated as the initial pose estimate 820 of the robot for use in subsequent pose estimations.

In a second mode, the pose estimation module 802 may have no initial indication of where the robot is within the environment. In other words, the initial pose estimate 820 may not yet be determined. In the second mode, the pose estimation module 802 may utilize global localization 814 rather than pose tracking/refinement 812 to determine the pose of the robot. The global localization block 814 may test associations between the candidate landmarks and mapped landmarks across the entire environment of the robot. The global localization block 814 may also output a pose estimate 816 and confidence/accuracy 818. Also in the second mode, the pose 816 and confidence/accuracy 818 determined by the global localization block 814 may be used in the post-processing module 804 to determine a refined pose estimate of the robot. Further, the pose estimate 816 derived during global localization 814 may be treated as the initial pose estimate 820 of the robot for use in subsequent pose estimations.

A post-processing module 804 may be used to refine the pose estimation derived from the pose tracking/refinement or global localization. The post-processing module may perform fusion extrapolation 822 of the pose estimate and confidence/accuracy of the localization module, and wheel odometry of the on-board sensing module. During fusion extrapolation, the refined pose estimate may rely more on the estimated pose provided by the localization module when there is a high confidence/accuracy. Conversely, the refined pose estimate may rely more on the wheel odometry when there is a low confidence/accuracy. Further, the post-processing module may provide a map update 824 based on the provided confidence/accuracy and refined pose estimate. For example, the map update may update locations of the mapped landmarks based on the refined pose estimate. In other examples, the map update may update statistical information associated with the mapped landmarks used to generate the refined pose estimation.

Each of the functions performed by the robot control system of FIG. 8 may be performed periodically. For example, navigation scanner 810 may perform scans at 8 Hz, while the wheel odometry 808 may update at 100 Hz. As another example, the processing blocks 812 and 814 of the pose estimation module may receive data from the on-board sensing module at 8 Hz, and may produce poses 816 and confidence/accuracies 818 at 8 Hz. Different frequencies are possible as well.

Figure 9:
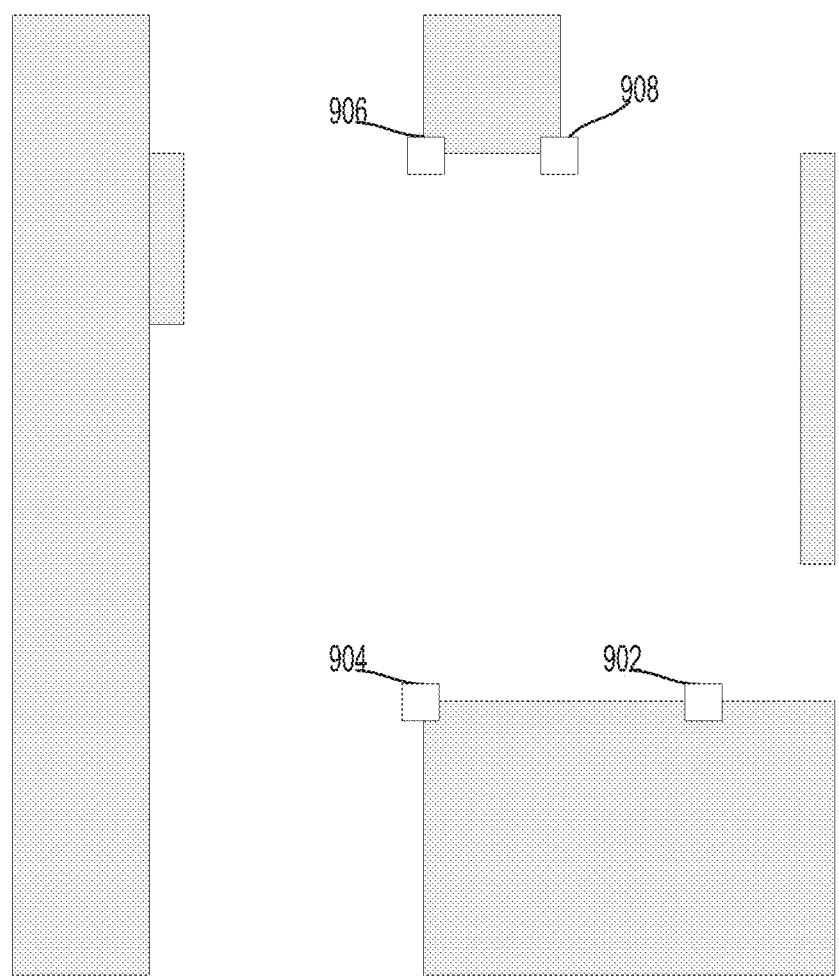
FIG. 9 shows a mapped environment of a robot, according to an example embodiment.

FIG. 9 shows a mapped environment of a robot, according to an example embodiment. Generating a pose estimate of the robot may rely on predetermined locations of landmarks within the environment. For example, mapped landmark 902 may correspond to a first coordinate (x1, y1) on the map, mapped landmark 904 may correspond to a second coordinate (x2, y2), mapped landmark 906 may correspond to a third coordinate (x3, y3), and mapped landmark 908 may correspond to a fourth coordinate (x4, y4). In this example, only an x and y axis may be relevant, because the mapped landmarks may be distributed on a substantially horizontal marker plane. For example, each retroreflector in a warehouse may be positioned at a height (corresponding to a z axis) of a predetermined (i.e., same) height above the floor. In other examples, the mapped landmarks may correspond to ranges of coordinates on a map. For example, the ranges of coordinates may correspond to sizes of the various landmarks. In still other examples, the mapped landmarks may correspond to three-dimensional (3-D) coordinates on a (3-D) map. Other ways of representing locations of the mapped landmarks are possible as well.

In some example embodiments, the mapped landmarks may be retroreflective markers configured to reflect light back to a source of the light. In such examples, the robot may include a light ranging and detection (LIDAR) unit configured to emit light to an area surrounding the robot. The retroreflective markers may reflect signals from the LIDAR unit back to the robot. The robot may include one or more sensors of the robot, which may be configured to receive reflected signals from the retroreflective markers and detect locations of the markers relative to the robot.

Figure 10:
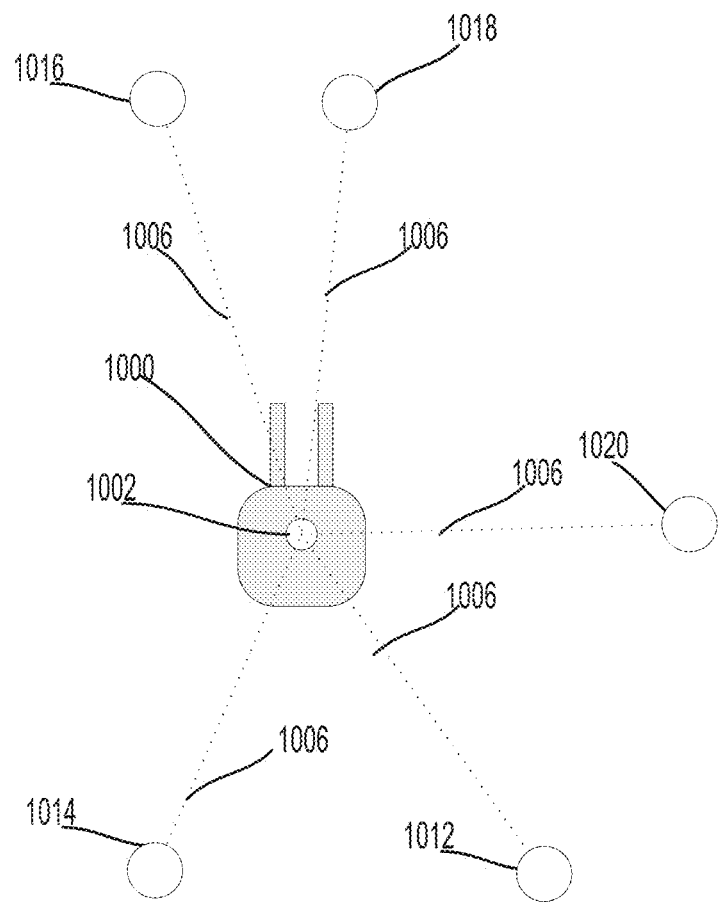
FIG. 10 shows a robot having made a number of detections, according to an example embodiment.

FIG. 10 shows a robot having made a number of detections, according to an example embodiment. Generating a pose estimate of the robot may further rely on signals 1006 detected by one or more sensors 1002 of the robot 1000. In one example, the signals may be associated with candidate landmarks 1012, 1014, 1016, 1018, and 1020. The signals may be indicative of locations of the candidate landmarks in relation to the robot. For example, candidate landmark 1012 may correspond to a radius relative to the robot 1000 (r1) and an angle relative to the robot 1000 ($\alpha$1), candidate landmark 1014 may correspond to a radius (r2) and an angle ($\alpha$2), candidate landmark 1016 may correspond to a radius (r3) and an angle ($\alpha$3), candidate landmark 1018 may correspond to a radius (r4) and an angle ($\alpha$4), and candidate landmark 1020 may correspond to a radius (r5) and an angle ($\alpha$5). In other examples, the candidate landmarks may be represented by Cartesian coordinates relative to the robot 1000. Other ways of representing locations of the candidate landmarks in relative to the robot are possible as well.

In some examples, the locations of the candidate landmarks may be determined by at least one sensor of the robot. That is, a sensor may receive signals indicative of locations of candidate landmarks. The sensor may generate sensor data representative of the received signals, and may determine the locations of the candidate landmarks based on the sensor data. A control system of the robot may then receive the locations of the candidate landmarks from the sensor. In other examples, at least one sensor may generate raw sensor data and one or more processors of the robot may process the raw sensor data to determine the locations of the candidate landmarks. For example, the processors may identify signals from ae sensor on the robot that have an intensity greater than an intensity threshold value. In still other examples, processors that are remote from the robot may detect the locations of the candidate landmarks based on the sensor data. Other ways of determining the locations of the candidate landmarks are possible as well.

The candidate landmarks may or may not correspond to a mapped landmark. For example, candidate landmarks 1012, 1014, 1016 and 1018 may correspond to mapped landmarks (e.g. the mapped landmarks 902, 904, 906, and 908 of FIG. 9), while candidate landmark 1020 may correspond to a false detection. False detections may make it difficult to align the candidate landmarks with corresponding mapped landmarks, and thus may hinder accurate pose estimates of the robot. Example embodiments follow that describe methods of vetting the candidate landmarks to achieve accurate pose estimates.

FIGS. 11A, 11B, 11C, and 11D illustrate determination of inliers associated with a sample set of candidate landmarks and corresponding mapped landmarks, according to an example embodiment. FIG. 11A shows a mapped environment of a robot. Mapped landmarks 1102, 1104, 1106, and 1108 have predetermined locations. FIG. 11B shows a robot having made a number of detections. The detections correspond to candidate landmarks 1112, 1114, 1116, 1118, and 1120. In the example embodiment, a sample set is determined that includes candidate landmarks 1112, 1114, and 1120, and corresponding mapped landmarks 1102, 1104, and 1106. In the present example, three candidate landmarks have been sampled. However, different numbers of sampled landmarks are possible as well. For example, the number of sampled landmarks may relate to a percentage of the total number of candidate landmarks.

In some embodiments, sampling the candidate landmarks may be performed pseudo-randomly. In other embodiments, sampling the candidate landmarks may be performed in an ordered fashion. For example, sampling the candidate landmarks may be performed in order of angle relative to the robot. In other examples, sampling the candidate landmarks may be performed in order of radius relative to the robot. In still other examples, the first candidate landmark may be chosen pseudo-randomly, and the other candidate landmarks may be sampled based on their proximity to the first candidate landmark. In yet other examples, the candidate landmarks may be chosen based on a desired geometry. For example, the candidate landmarks that most closely resemble an isosceles triangle may be sampled. In another example, the candidate landmarks that most closely resemble a line may be sampled. Other ways of sampling the candidate landmarks are possible as well.

In some embodiments, corresponding mapped landmarks may be selected in a similar fashion to the sampled candidate landmarks. In other embodiments, corresponding mapped landmarks may be sampled that form a similar geometry to the sampled candidate landmarks. In present example, sampled mapped landmarks 1102, 1104, and 1006 most closely resemble the geometry formed by the sampled candidate landmarks 1112, 1114, and 1120. Other ways of sampling the corresponding mapped landmarks are possible as well.

In some embodiments, several sample sets may be determined, each including a different combination of candidate landmarks and corresponding mapped landmarks. Each of the sample sets may be vetted to determine which ones adequately represent the pose of the robot.

FIG. 11C shows a transformation determined based on a sample set that has been applied to all of the candidate landmarks. A transformation may be determined for the sample set that relates the sampled subset of candidate landmarks to the corresponding mapped landmarks. For example, the transformation may translate and rotate the candidate landmarks so as to minimize distances between the sampled candidate landmarks and the corresponding mapped landmarks. In this example embodiment, sampled candidate landmarks 1112, 1114, and 1120 have been oriented to minimize the overall distance from corresponding mapped landmarks 1104, 1106, and 1102. A least squares method such as an iterative closest point (ICP) algorithm may achieve this alignment. Any similar algorithm may appropriately align the sampled subset of candidate landmarks with the corresponding mapped landmarks. Other transformations are possible as well.

While the transformation may be determined based on the sampled subset of candidate landmarks and corresponding mapped landmarks, the transformation may be applied to all of the candidate landmarks. In the present example, the transformation is applied to non-sampled candidate landmarks 1116 and 1118 in addition to the sampled candidate landmarks.

Once the determined transformation has been applied to the candidate landmarks, the distances between the transformed candidate landmarks and neighboring mapped landmarks may be determined. A neighboring mapped landmark corresponding to a particular transformed candidate landmark may be a closest mapped landmark after the transformation is applied. In some examples, each mapped landmark may only serve as a neighboring mapped landmark to one transformed candidate landmark (e.g., a single mapped landmark cannot qualify multiple candidate landmarks as inliers). In this example, mapped landmark 1102 is a neighboring mapped landmark of transformed candidate landmark 1120, mapped landmark 1104 is a neighboring mapped landmark of transformed candidate landmark 1112, and mapped landmark 1106 is a neighboring mapped landmark of transformed candidate landmark 1114.

The transformation may be generally indicative of a potential pose of the robot 1100. The distances between the transformed candidate landmarks and the neighboring landmarks may indicate whether or not the transformation presents a viable pose. For example, a number of inliers associated with the transformation may be determined.

FIG. 11D shows a number of inliers associated with transformed candidate landmarks, according to an example embodiment. Each of the inliers may be determined based on an inlier distance threshold. The inlier distance threshold may be indicative of whether a transformed candidate landmark is adequately aligned with any of the mapped landmarks. In the present example, the inlier distance threshold is represented by radii 1130, 1132, and 1134, which encircle transformed candidate landmarks 1120, 1112, and 1114 respectively. Any transformed candidate landmark within the threshold distance of a neighboring mapped landmark may be considered an inlier. In the present example, transformed candidate landmarks 1112, 1114, and 1120 may be considered inliers. Not depicted in FIG. 11D are candidate landmarks 1116 and 1118, which are not considered inliers. Also not depicted in FIG. 11D is mapped landmark 1108 which is not within the inlier distance threshold of any of the transformed candidate landmarks.

A sampled subset that includes a false detection may result in a transformation that does not adequately represent the pose of the robot. In the present example, candidate landmarks 1112, 1114, 1116, and 1118 correspond to mapped landmarks, respectively, while candidate landmark 1120 corresponds to a false detection. FIGS. 11C and 11D show an example embodiment of a transformation that does not adequately represent the pose of the robot because the sampled subset includes a false detection.

In the present example, three inliers are determined from five transformed candidate landmarks. In other words, three out of five candidate landmarks can be considered adequately aligned based on the transformation. It may be determined that three out of five candidate landmarks having inliers does not correspond to a viable transformation, which in turn does not indicate a viable pose of the robot. Other factors may contribute to a determination that the transformation is not viable. In FIGS. 11A-D, for example, none of the non-sampled candidate landmarks are associated with an inlier. It may be common for the transformed sampled candidate landmarks to be associated with inliers, because the determined transformation is meant to best align the sampled candidate landmarks to the corresponding mapped landmarks. Thus, whether the non-sampled candidate landmarks are associated with inliers may be given more weight in determining the viability of the transformation. In examples where the number of inliers is determined to be insufficient, other candidate landmarks and corresponding mapped landmarks may be sampled, the other candidate landmarks may be transformed, and a number of inliers associated with the other candidate landmarks may be determined.

Figure 12A:
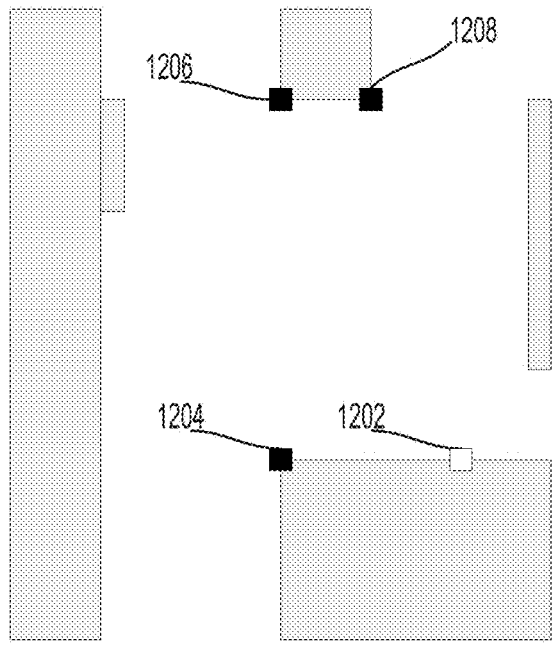
FIGS. 12A, 12B, 12C, and 12D illustrate determination of inliers associated with another sample set of candidate landmarks and corresponding mapped landmarks, according to an example embodiment.
Figure 12B:
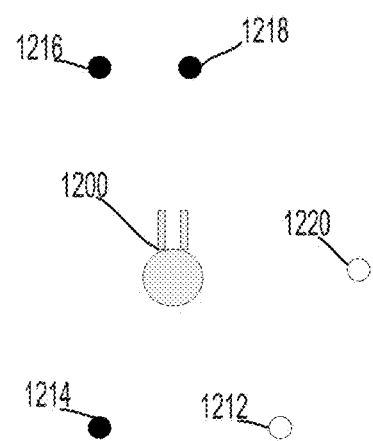
Figure 12C:
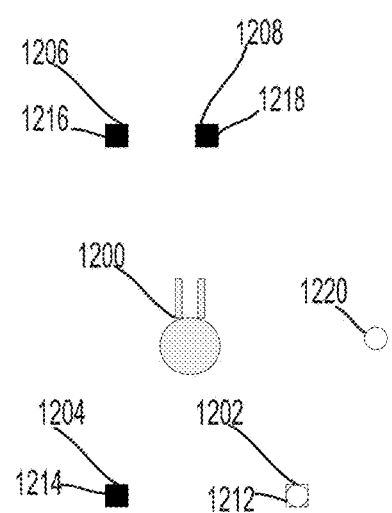
Figure 12D:
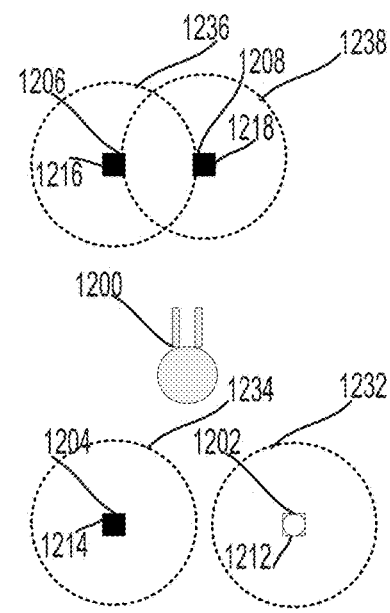

FIGS. 12A, 12B, 12C, and 12D illustrate determination of inliers associated with another sample set of candidate landmarks and corresponding mapped landmarks, according to an example embodiment. FIG. 12A shows the same mapped environment of a robot as depicted in FIG. 11A. Similarly, FIG. 12B shows a robot having made the same detections as those depicted in FIG. 12B. However, FIGS. 12A and 12B depict a different sample set. In the present example, candidate landmarks 1214, 1216, and 1218 and corresponding mapped landmarks 1204, 1206, and 1208 are sampled. FIG. 12C shows a transformation determined from the sample set as applied to all of the candidate landmarks. In the present example, the transformation is determined based on sampled candidate landmarks 1214, 1216, and 1218 and corresponding mapped landmarks 1204, 1206, and 1208. The transformation is also applied to non-sampled landmarks 1212 and 1220. FIG. 12D shows a number of inliers associated with transformed candidate landmarks aligned with map landmarks. Sampled candidate landmarks 1214, 1216, and 1218 are inliers because they correspond to neighboring mapped landmarks 1204, 1206, and 1208, which are within radii 1234, 1236 and 1238 of the sampled candidate landmarks. Non-sampled candidate landmark 1212 is also an inlier, because neighboring mapped landmark 1202 is within radius 1232 of candidate landmark 1212.

FIG. 12D shows an example embodiment that includes four inliers out of five candidate landmarks. It may be determined that four out of five candidate landmarks having inliers corresponds to a viable transformation, which in turn indicates a viable pose of the robot. This determination may be made because there are a total of four sampled and neighboring landmarks 1202, 1204, 1206, and 1208. Thus, determining four inliers in the present example is indicative of a transformation that adequately aligns candidate landmarks with each and every relevant mapped landmark. Other factors may contribute to a determination that the transformation is viable. In FIG. 12D, for example, one of the non-sampled candidate landmarks is associated with an inlier. It may be significant for non-sampled candidate landmarks to be associated with an inlier, because a transformation that derives from one or more false detections is less likely to allow for inliers associated with non-sampled candidate landmarks, as shown by FIGS. 11A-11D.

FIGS. 12A-12D show that a sampled subset that only includes candidate landmarks that correspond to mapped landmarks may result in a transformation that adequately represents the pose of the robot. While FIGS. 11A-11D showed how false detections far from any mapped landmarks can render a transformation inadequate, some examples may include false detections that are close to a mapped landmark.

Figure 13A:
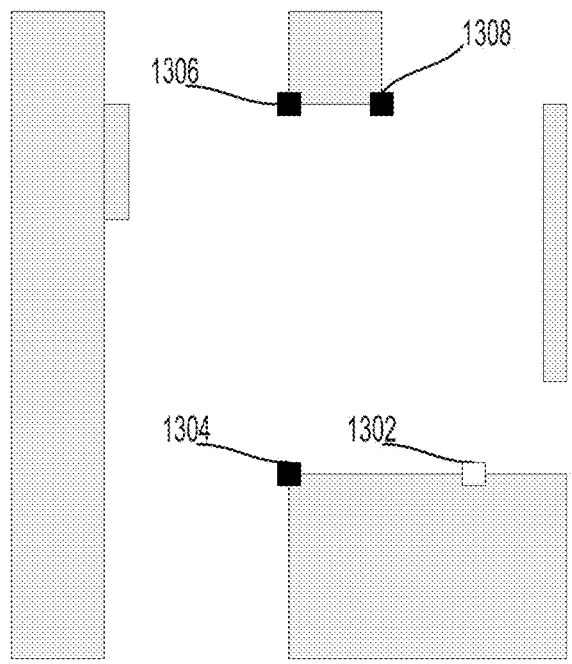
FIGS. 13A, 13B, 13C, and 13D illustrate determination of inliers associated with yet another sample set of candidate landmarks and corresponding mapped landmarks, according to an example embodiment.
Figure 13B:
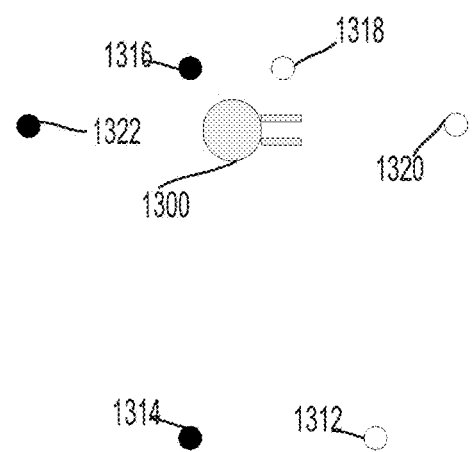

FIGS. 13A, 13B, 13C, and 13D illustrate determination of inliers associated with yet another sample set of candidate landmarks and corresponding mapped landmarks, according to an example embodiment. FIG. 13A shows the same mapped environment of a robot as depicted in FIGS. 11A and 12A. However, FIG. 13B shows a robot having made two additional detections (candidate landmarks 1320 and 1322), and having lost a detection (candidate landmark 1120/1220 of FIGS. 11B/12B). The present example shows that as the robot 1300 changes its position and orientation within the environment, it may detect additional false detections. For example, candidate landmarks 1312, 1314, 1316, and 1318 may correspond to mapped landmarks 1302, 1304, 1306, and 1308, respectively, while candidate landmarks 1320 and 1322 may correspond to false detections. This is in contrast to the examples shown in FIGS. 11A-D and 12A-D, which each only included one false detection (candidate landmark 1120/1220 of FIGS. 11B/12B) at a different position and orientation of the robot (1100/1200 of FIGS. 11B/12B).

Figure 13C:
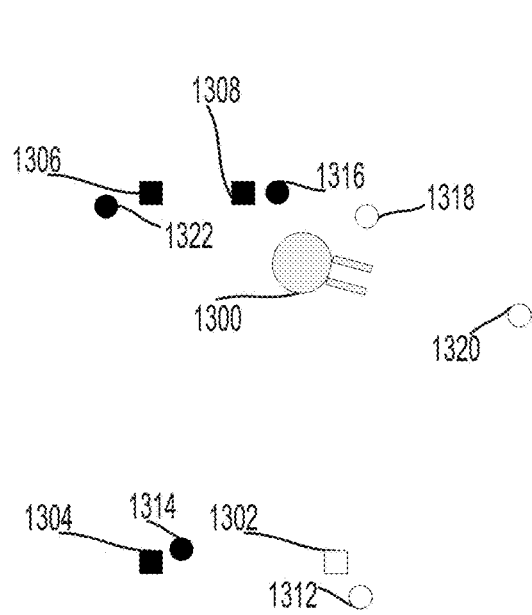
Figure 13D:
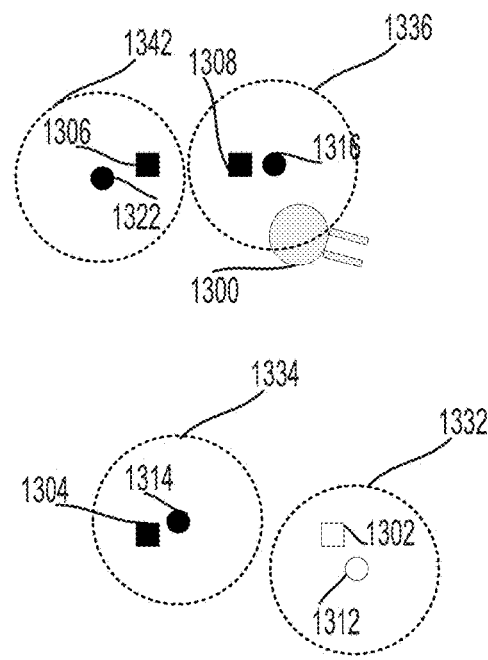

FIG. 13C shows a transformation determined from a sample set as applied to all of the candidate landmarks. In the present example, the sample set includes candidate landmarks 1314, 1322, and 1316, and corresponding mapped landmarks 1304, 1306, and 1308. FIG. 13D shows that the transformation produces four inliers. Specifically, sampled candidate landmarks 1314, 1322, and 1316 are aligned with neighboring mapped landmarks 1304, 1306, and 1308, respectively, such that the neighboring mapped landmarks fall within radii 1334, 1342, and 1336. Additionally, non-sampled candidate landmark 1312 is aligned with neighboring mapped landmark 1302, such that neighboring mapped landmark 1302 falls within radius 1332. Thus, FIG. 13D shows that a sampled subset of candidate landmarks may produce a seemingly viable transformation despite including a false detection (e.g. candidate landmark 1322). FIGS. 13C-D also show that the transformation using the false detection may indicate a slightly shifted pose estimate of the robot. An inaccurate pose estimate may cause the robot to navigate ineffectively through the environment.

Several measures may be taken to mitigate negative effects of scenarios like the one depicted in FIGS. 13A-D. For example, the inlier distance threshold may be reduced. This way, even false detections that are close to a mapped landmark will generally not produce the same number of inliers as a sampled subset that does not include false detections. Further, even when a false detection yields such a transformation, the pose will be shifted to a lesser extent than, for example, the shift shown in FIG. 13C. In the present example, the inlier distance threshold may be reduced such that transformed candidate landmark 1312 does not produce an inlier. Even so, reducing the inlier distance threshold may still allow for shifted pose estimates caused by false detections.

Further, though a sample set that includes a false detection may produce a viable transformation, that sample set will not necessarily be selected to estimate the pose of the robot. Another, more suitable sampled subset may be chosen instead. For example, when two or more sample sets produce the same number of inliers, the transformed sample set with the lowest net distance to the mapped landmarks may be selected. For example, the transformation depicted in FIG. 12D may be preferable to the transformation depicted in FIG. 13D because the distances between candidate landmark/mapped landmark pairs 1212/1202, 1214/1204, 1216/1206, and 1218/1208 are smaller than the distances between 1312/1302, 1314/1304, 1322/1306, and 1316/1308. In an additional example, sample sets that produce the same number of inliers may be iteratively compared to one another. The inlier distance threshold may be decreased each iteration until one sample set has more inliers than the others.

Once a sample set is selected, a pose estimate of the robot may be determined based on the sample set. In some examples, the transformation already determined for the sample set may be applied directly to determine an estimated robot pose. In other examples, a refined transformation may be determined using all of the inliers associated with the selected sample set. The refined transformation may then be applied to produce a more accurate robot pose estimate. Other examples of pose estimates are possible as well.

Some examples may also include determining a pose estimation confidence associated with the sampled subset. The pose estimation confidence may generally relate to the number of determined inliers associated with the sampled subset in comparison to the total number of candidate landmarks. For example, the pose estimation confidence may be based on a ratio of the number of determined inliers to a total number of candidate landmarks. In this example, a ratio close to one would indicate a high likelihood of an accurate pose estimate. Conversely, a ratio close to zero would indicate a low likelihood of an accurate pose estimate.

In some examples, the pose estimation confidence may be considered in determining a refined pose estimate. For instance, a selected sampled subset with a high pose estimation confidence may be the primary contributor to the refined pose estimate. A selected sampled subset with a low pose estimate confidence may be a secondary contributor to the refined pose estimate. For example, the refined pose estimate may derive from wheel odometry moreso than from the selected sample set. In this way, completing the pose estimate may be reminiscent of Kalman filtering.

Other examples may include determining an accuracy of the pose estimate associated with the sampled subset. The accuracy may be based on statistical information that relates to past pose estimates of the robot. For example, a covariance matrix may be determined for each mapped landmark. The covariance matrix may include the location and orientation of past pose estimates. A pose estimate that does not match well with the covariance matrix may not be as accurate as a pose estimate that fits the covariance matrix. For example, a pose estimate based on the sample set in FIGS. 13A-13D may not fit the covariance matrix for mapped landmark 1306 as well as a pose estimate derived from the sample set of FIGS. 12A-12D would for mapped landmark 1206. This may occur because the pose of robot 1300 includes two false detections (candidate landmarks 1320 and 1322) which may shift the pose estimate, whereas robot 1200 includes only one false detection (candidate landmark 1220). In some examples, a sample set may be selected that is deemed more accurate than another, even though both sample sets produce the same number inliers. In further examples, a pose estimate may be refined based on the determined accuracy of the pose estimate in much the same way described for the pose estimation confidence.

Figure 14:
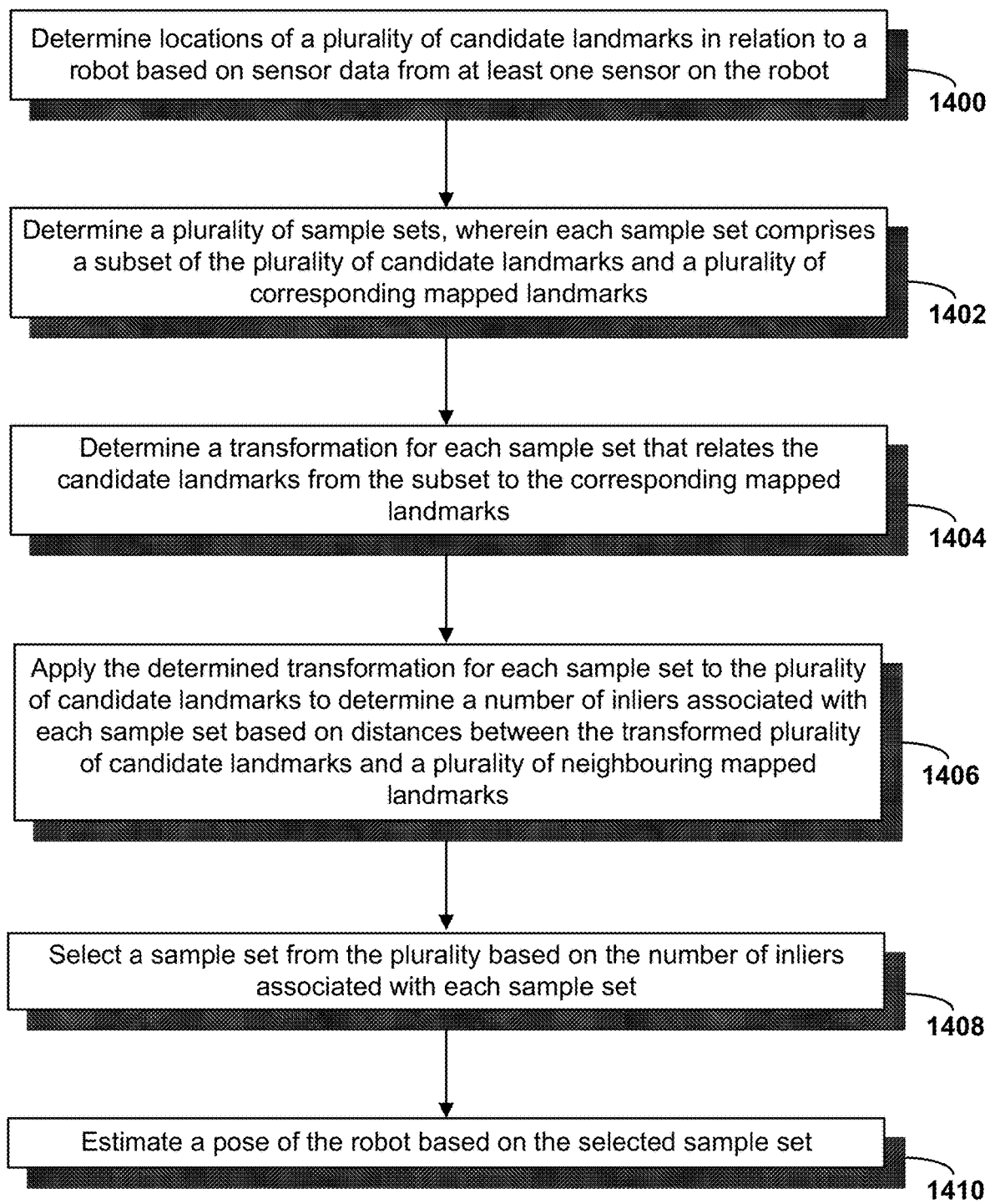
FIG. 14 is a block diagram of a method, according to an example embodiment.

FIG. 14 is a block diagram of a method that may be used to estimate a pose of a robot within an environment of the robot according to an example embodiment. In some examples, the method may be carried out as part of a system. For example, block 1400 may be carried out by one or more sensors of a robot in conjunction with one or more processors executing program instructions stored on a non-transitory computer readable medium. In the example, the one or more sensors of the robot may receive signals from the plurality of candidate landmarks, while the executed program instructions may determine the locations of the candidate landmarks in relation to the robot based on the received signals. The one or more processors may execute the program instructions to also perform the functions included in blocks 1402, 1404, 1406, 1408, and 1410.

In other examples, the method may be carried out as part of a computing system. In these examples, a non-transitory computer readable medium may store instructions executable by one or more processors to cause the computing system to perform the blocks of the method.

In these examples, the one or more processors and non-transitory computer readable medium may perform the blocks remotely. In other examples, the one or more processors and non-transitory computer readable medium may carry out the method at the robot. In still other examples, portions of the method may be carried out remotely, while other portions may be carried out at the robot.

Block 1400 of the method may be performed to determine locations of a plurality of candidate landmarks in relation to a robot based on sensor data from at least one sensor on the robot. For example, one or more sensors of the robot may receive signals. The signals may emanate from landmarks in an environment of the robot or from other objects in the environment. Locations of the landmarks and objects may be determined. Each detection may be treated as a candidate landmark.

Block 1402 of the method may be performed to determine a plurality of sample sets, wherein each sample set comprises a subset of the plurality of candidate landmarks and a plurality of corresponding mapped landmarks. For example determining the plurality of sample sets may comprise selecting three candidate landmarks for each sample set from the plurality of candidate landmarks based on the locations of the plurality of candidate landmarks in relation to the robot. The sample set may also include three corresponding mapped landmarks.

In another example, determining the plurality of sample sets may comprise identifying, based on an initial pose estimate of the robot, candidate landmarks that are within a correspondence threshold of corresponding mapped landmarks, wherein each sample set comprises a subset of the identified candidate landmarks and corresponding mapped landmarks. For example, a robot that has an initial pose estimate of (x1, y1) and orientation α1 may detect candidate landmarks at locations relative to the robot. The robot may also have odometry data. The general pose of the robot may be inferred based on the initial pose estimate and the odometry data. The positions of the candidate landmarks in the environment may be inferred accordingly. A map of the environment may be searched to determine mapped landmarks within a correspondence threshold of the inferred locations of the candidate landmarks. The candidate landmarks and mapped landmarks within the correspondence threshold may form correspondence pairs. The sample set may be determined from the correspondence pairs.

Block 1404 of the method may be performed to determine a transformation for each sample set that relates the candidate landmarks from the subset to the corresponding mapped landmarks. The transformation may use a least means squared algorithm such as an ICP algorithm to align sampled candidate landmarks of the sample set to corresponding mapped landmarks.

Block 1406 of the method may be performed to apply the transformation for each sample set to the plurality of candidate landmarks to determine a number of inliers associated with each sample set based on distances between the transformed plurality of candidate landmarks and a plurality of neighbouring mapped landmarks. Distances between the transformed plurality of candidate landmarks and neighboring mapped landmarks may be determined. Transformed candidate landmarks having a neighboring mapped landmark within an inlier distance threshold may be considered inliers.

Block 1408 of the method may be performed to select a sample set from the plurality based on the number of inliers associated with each sample set. A sample set of the plurality having the highest number of inliers may be selected. In other examples, the first sample set of the plurality to produce a predetermined number of inliers may be selected.

Figure 15:
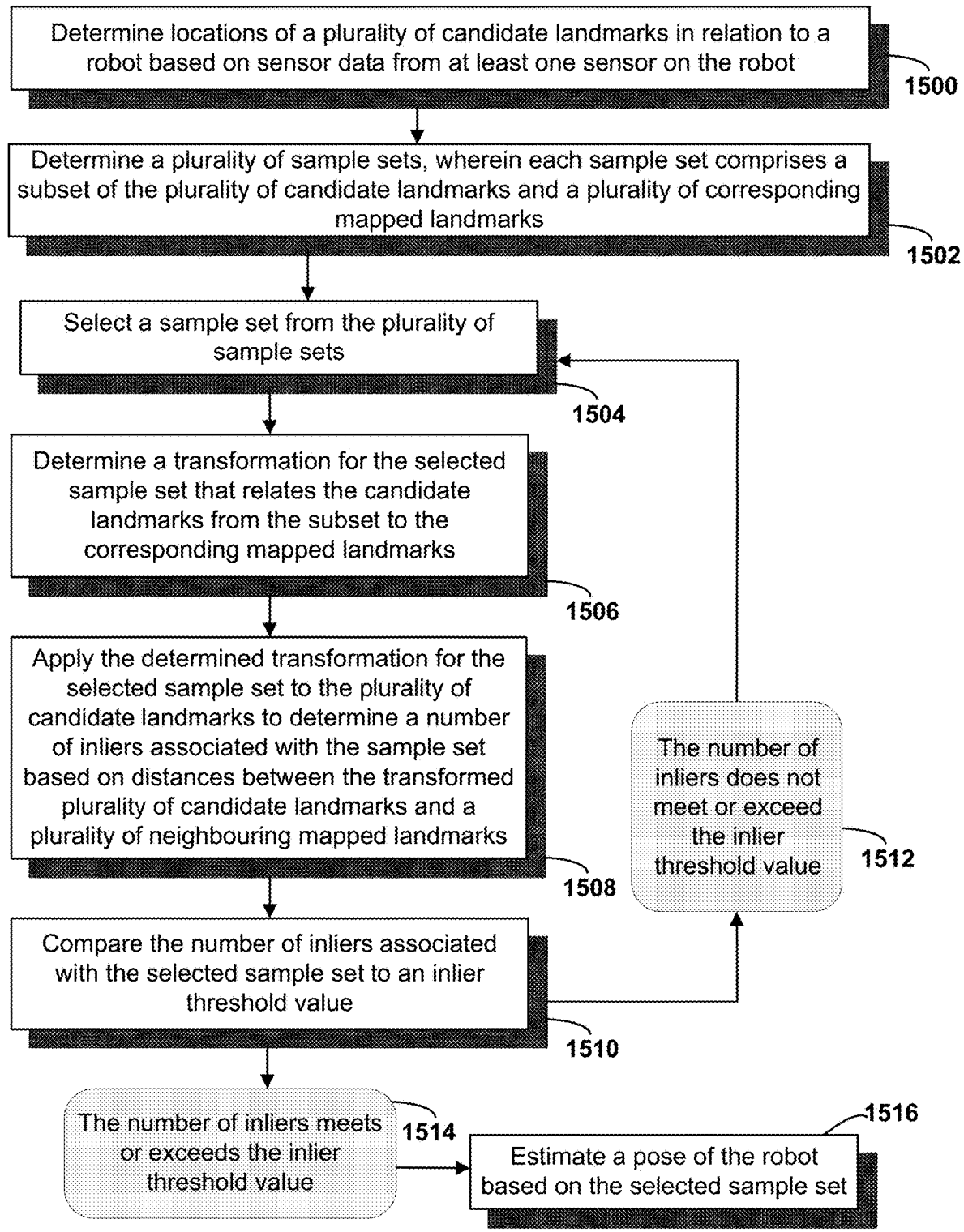
FIG. 15 is a block diagram of another method, according to an example embodiment.

Block 1410 of the method may be performed to estimate a pose of the robot based on the selected sample set. The pose may be estimated using the determined transformation for the selected sample set. In other examples, a refined transformation based on all of the inliers associated with the selected sample set may be used for more precision FIG. 15 a block diagram of another method that may be used to estimate a pose of a robot within an environment of the robot according to an example embodiment. The method illustrated by FIG. 15 may also be carried out by a system or a computer system in much the same way as described above in relation to FIG. 14.

Block 1500 of the method may be performed to determine locations of a plurality of candidate landmarks in relation to a robot based on sensor data from at least one sensor on the robot.

Block 1502 of the method may be performed to determine a plurality of sample sets, wherein each sample set comprises a subset of the plurality of candidate landmarks and a plurality of corresponding mapped landmarks.

Block 1504 of the method may be performed to select a sample set from the plurality of sample sets. Selecting a sample set from the plurality may be based on an order of the plurality. For example, at block 1504, the method may select each sample set as it is determined by block 1502.

Block 1506 of the method may be performed to determine a transformation for the selected sample set that relates the candidate landmarks from the subset to the corresponding mapped landmarks. The transformation may use a least means squared algorithm such as an ICP algorithm to align sampled candidate landmarks of the sample set to corresponding mapped landmarks.

Block 1508 of the method may be performed to apply the transformation for the selected sample set to the plurality of candidate landmarks to determine a number of inliers associated with the selected sample set based on distances between the transformed plurality of candidate landmarks and a plurality of neighbouring mapped landmarks.

Block 1510 of the method may be performed to compare the number of inliers associated with the selected sample set to an inlier threshold value. For example, the inlier threshold value may be a predetermined number, and the number of inliers associated with the selected sample set of block 1504 may be compared to the threshold. In other examples, the inlier threshold may be a predetermined percentage, and the percentage of inliers associated with the selected sample set of block 1504 relative to the total number of candidate landmarks may be compared to the threshold percentage. Block 1510 may act as a ternary operator in the method. For example, determining that the threshold is met may have one result, while determining that the threshold is not met may have another.

Block 1512 of the method represents the result of block 1510 when the number of inliers does not meet or exceed the inlier threshold value. This results in block 1504 being performed, and a different sample set is selected. The method therefore involves sequentially determining the number of inliers for each of the sample sets until one of the sample sets is determined to have a number of inliers that meets or exceeds an inlier threshold value.

Block 1514 of the method represents the result of block 1510 when the number of inliers meets or exceeds the inlier threshold value. This results in block 1516 being performed.

Block 1516 of the method may be performed to estimate a pose of the robot based on the selected sample set in much the same way as previously described.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. In the figures, similar symbols typically identify similar components, unless context dictates otherwise. The example embodiments described herein and in the figures are not meant to be limiting. Other embodiments can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

A block that represents a processing of information may correspond to circuitry that can be configured to perform the specific logical functions of a herein-described method or technique. Alternatively or additionally, a block that represents a processing of information may correspond to a module, a segment, or a portion of program code (including related data). The program code may include one or more instructions executable by a processor for implementing specific logical functions or actions in the method or technique. The program code and/or related data may be stored on any type of computer readable medium such as a storage device including a disk or hard drive or other storage medium.

The computer readable medium may also include non-transitory computer readable media such as computer-readable media that stores data for short periods of time like register memory, processor cache, and random access memory (RAM). The computer readable media may also include non-transitory computer readable media that stores program code and/or data for longer periods of time, such as secondary or persistent long term storage, like read only memory (ROM), optical or magnetic disks, compact-disc read only memory (CD-ROM), for example. The computer readable media may also be any other volatile or non-volatile storage systems. A computer readable medium may be considered a computer readable storage medium, for example, or a tangible storage device.

Moreover, a block that represents one or more information transmissions may correspond to information transmissions between software and/or hardware modules in the same physical device. However, other information transmissions may be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

What is claimed is:

1. A method comprising:
   determining locations of a plurality of candidate landmarks in relation to a robot based on sensor data from at least one sensor of the robot;
   determining a plurality of sample sets, wherein each sample set comprises a subset of the plurality of candidate landmarks and a plurality of corresponding mapped landmarks;
   for each sample set of the plurality of sample sets:
      determining a transformation that relates the candidate landmarks from the subset of the plurality of candidate landmarks to the corresponding mapped landmarks of the plurality of corresponding mapped landmarks;
      applying the determined transformation to the plurality of candidate landmarks; and
      determining a number of inliers associated with the sample set based on distances between the transformed plurality of candidate landmarks and a plurality of neighbouring mapped landmarks;
   selecting a sample set from the plurality of sample sets based on the determined number of inliers associated with each sample set from the plurality of sample sets; and
   estimating a pose of the robot based on the selected sample set.

2. The method of claim 1, further comprising navigating the robot within an environment of the robot based on the estimated pose.

3. The method of claim 1, wherein determining the plurality of sample sets comprises identifying, based on an initial pose estimate of the robot, candidate landmarks that are within a correspondence distance threshold of corresponding mapped landmarks, wherein each sample set comprises a subset of the identified candidate landmarks and corresponding mapped landmarks.

4. The method of claim 1, further comprising determining a pose estimation confidence associated with the estimated pose based on a ratio of the determined number of inliers associated with the selected sample set to a total number of candidate landmarks in the plurality of candidate landmarks, wherein a higher ratio of inliers to candidate landmarks indicates fewer false detections in the plurality of candidate landmarks.

5. The method of claim 1, further comprising determining an accuracy of the estimated pose, wherein determining the accuracy comprises comparing the pose estimate to statistical data that represents past pose estimates.

6. The method of claim 1, wherein selecting the sample set from the plurality comprises sequentially determining the number of inliers for each of the sample sets until one of the sample sets is determined to have a number of inliers that meets or exceeds an inlier threshold value.

7. The method of claim 1, wherein determining the plurality of sample sets comprises:
   selecting a first corresponding mapped landmark for each sample set; and
   selecting subsequent corresponding mapped landmarks for each sample set based on positions of the subsequent corresponding mapped landmarks relative to the selected first corresponding mapped landmark.

8. The method of claim 1, wherein determining the locations of the plurality of candidate landmarks in relation to the robot comprises receiving the locations from at least one sensor of the robot.

9. The method of claim 1, wherein determining the locations of the plurality of candidate landmarks in relation to the robot comprises identifying signals from the at least one sensor of the robot that have an intensity greater than an intensity threshold value.

10. The method of claim 1, further comprising:
determining a refined transformation that relates the inliers associated with the selected sample set to neighbouring mapped landmarks from the plurality of mapped landmarks; and
estimating the pose of the robot based on the refined transformation.

11. The method of claim 1, wherein determining the plurality of sample sets comprises selecting three candidate landmarks for each sample set from the plurality of candidate landmarks based on the locations of the plurality of candidate landmarks in relation to the robot.

12. The method of claim 1, wherein determining the transformation for each sample set that relates the candidate landmarks from the sample set to the corresponding mapped landmarks comprises estimating a shifted location and orientation of the candidate landmarks from the sample set to align with the corresponding mapped landmarks.

13. The method of claim 1, wherein each of the plurality of candidate landmarks correspond to either a mapped landmark or a false detection, and wherein false detections comprise detected signals that are not associated with a landmark or that misrepresent the location of a landmark, the method further comprising:
concurrently with selecting the sample set from the plurality of sample sets, filtering out false detections from the plurality of candidate landmarks based on the determined number of inliers associated with each sample set.

14. The method of claim 1, wherein selecting the sample set from the plurality of sample sets comprises:
determining that two or more sample sets result in the same number of inliers; and
responsive to determining that the two or more sample sets result in the same number of inliers, selecting a sample set from the two or more samples sets that has a lowest net distance between the transformed candidate landmarks and the mapped landmarks.

15. The method of claim 1, wherein estimating the pose of the robot based on the selected sample set comprises estimating the pose of the robot based on a transformation of the inliers associated with the selected sample set.

16. A non-transitory computer readable medium having stored therein instructions executable by one or more processors to cause a computing system to perform the functions comprising:
determining locations of a plurality of candidate landmarks in relation to a robot based on sensor data from at least one sensor of the robot;
determining a plurality of sample sets, wherein each sample set comprises a subset of the plurality of candidate landmarks and a plurality of corresponding mapped landmarks;
for each sample set of the plurality of sample sets:
determining a transformation that relates the candidate landmarks from the subset of the plurality of candidate landmarks to the corresponding mapped landmarks of the plurality of corresponding mapped landmarks;
applying the determined transformation to the plurality of candidate landmarks; and
determining a number of inliers associated with the sample set based on distances between the transformed plurality of candidate landmarks and a plurality of neighbouring mapped landmarks;
selecting a sample set from the plurality of sample sets based on the determined number of inliers associated with each sample set from the plurality of sample sets; and
estimating a pose of the robot based on the selected sample set.

17. The non-transitory computer readable medium of claim 16, further having stored therein a map of landmark locations, wherein the functions further comprise:
determining the plurality of corresponding mapped landmarks for each sample set based on the map of landmark locations.

18. The non-transitory computer readable medium of claim 16, further having stored therein statistical information associated with the corresponding mapped landmarks, wherein the statistical information relates to past pose estimates of the robot, wherein the functions further comprise:
determining an accuracy of the pose estimate, wherein determining the accuracy comprises comparing the pose estimate associated with the selected sample set to the statistical information.

19. A system, comprising;
a robot;
at least one sensor coupled to the robot;
one or more processors;
a non-transitory computer readable medium; and
program instructions stored on the non-transitory computer readable medium and executable by the one or more processors to:
determine locations of a plurality of candidate landmarks in relation to a robot based on sensor data from at least one sensor of the robot;
determine a plurality of sample sets, wherein each sample set comprises a subset of the plurality of candidate landmarks and a plurality of corresponding mapped landmarks;
for each sample set of the plurality of sample sets:
determine a transformation that relates the candidate landmarks from the subset of the plurality of candidate landmarks to the corresponding mapped landmarks of the plurality of corresponding mapped landmarks;
apply the determined transformation to the plurality of candidate landmarks; and
determine a number of inliers associated with the sample set based on distances between the transformed plurality of candidate landmarks and a plurality of neighbouring mapped landmarks;
select a sample set from the plurality of sample sets based on the determined number of inliers associated with each sample set from the plurality of sample sets; and
estimate a pose of the robot based on the selected sample set.

20. The system of claim 19, further comprising a light detection and ranging (LIDAR) unit coupled to the robot, wherein the LIDAR unit is configured to emit light signals to an area surrounding the robot to detect the plurality of candidate landmarks.

\* \* \* \* \*